US008795072B2

(12) United States Patent
Borst et al.

(10) Patent No.: US 8,795,072 B2
(45) Date of Patent: Aug. 5, 2014

(54) METHOD AND SYSTEM FOR PROVIDING A VIRTUAL PRESENTATION INCLUDING A VIRTUAL COMPANION AND VIRTUAL PHOTOGRAPHY

(75) Inventors: Karl Joseph Borst, Toronto (CA); Jessica Boyd, Etobicoke (CA); Michael Kwant, Scarborough (CA)

(73) Assignee: Ganz, Woodbridge, Ontario ( * ) Notice: Subject to any disclaimer, the term of this patent is extended or adjusted under 35 U.S.C. 154(b) by 882 days.

(21) Appl. No.: 12/578,526

(22) Filed: Oct. 13, 2009

(65) Prior Publication Data

US 2011/0086702 A1 Apr. 14, 2011

(51) Int. Cl.
 *A63F 13/00* (2014.01)
(52) U.S. Cl.
 USPC .................................. 463/30; 463/9; 463/42
(58) Field of Classification Search
 USPC ........................................ 463/9, 30, 31, 42
 See application file for complete search history.

(56) References Cited

U.S. PATENT DOCUMENTS

| 5,411,259 | A | 5/1995 | Pearson |
| 6,009,458 | A | 12/1999 | Hawkins et al. |
| 6,119,229 | A | 9/2000 | Martinez et al. |
| 6,175,857 | B1 | 1/2001 | Hachiya et al. |
| 6,200,216 | B1 | 3/2001 | Peppel |
| 6,253,167 | B1 | 6/2001 | Matsuda |
| 6,267,672 | B1 | 7/2001 | Vance |
| 6,311,195 | B1 | 10/2001 | Hachiya et al. |
| 6,368,177 | B1 | 4/2002 | Gabai et al. |
| 6,406,370 | B1 | 6/2002 | Kumagai |
| 6,449,518 | B1 | 9/2002 | Yokoo et al. |
| 6,468,155 | B1 | 10/2002 | Berlin et al. |
| 6,494,762 | B1 | 12/2002 | Bushmitch et al. |
| 6,554,679 | B1 | 4/2003 | Shackelford et al. |
| 6,560,511 | B1 | 5/2003 | Yokoo et al. |
| 6,595,858 | B1 | 7/2003 | Tajiri |
| 6,616,532 | B2 | 9/2003 | Albrecht |

(Continued)

FOREIGN PATENT DOCUMENTS

| GB | 2365364 | 2/2002 |
| JP | 2002063092 | 2/2002 |

(Continued)

OTHER PUBLICATIONS

Lehdonvirta, "Virtual Economics: Applying Economics to the Study of Game Worlds"; Helsinki Institute for Information Technology, 2005.

(Continued)

*Primary Examiner* — James S McClellan
(74) *Attorney, Agent, or Firm* — Peane & Gordon LLP

(57) ABSTRACT

A method and computer system for providing a virtual presentation is provided. A plurality of different groups of virtual objects within a virtual world on a display device, wherein at least one of the different groups is selectable by a user. The desired group of virtual objects are to be displayed within a virtual optical viewfinder. A selection tool is provided within the virtual optical viewfinder and is controllable by the user to select a target virtual object from the desired group of virtual objects displayed within the virtual optical viewfinder. The user is presented with a magnified image of the target virtual object and revealing an identity of the target virtual object that has been selected in response to selection of the target virtual object by the user.

43 Claims, 22 Drawing Sheets

(56) References Cited

U.S. PATENT DOCUMENTS

| | | |
|---|---|---|
| 6,663,105 B1 | 12/2003 | Sullivan |
| 6,685,565 B2 | 2/2004 | Tanibuchi et al. |
| 6,729,884 B1 | 5/2004 | Kelton et al. |
| 6,735,324 B1 | 5/2004 | McKinley et al. |
| 6,739,941 B1 | 5/2004 | Brownsberger |
| 6,745,236 B1 | 6/2004 | Hawkins et al. |
| 6,758,678 B2 | 7/2004 | Van Gilder |
| 6,773,325 B1 | 8/2004 | Mawle et al. |
| 6,910,186 B2 | 6/2005 | Kim |
| 6,948,131 B1 | 9/2005 | Neven et al. |
| 6,951,516 B1 | 10/2005 | Eguchi et al. |
| 7,037,166 B2 | 5/2006 | Shrock et al. |
| 7,054,831 B2 | 5/2006 | Koenig |
| 7,066,781 B2 | 6/2006 | Weston |
| 7,086,923 B2 | 8/2006 | Karabees |
| 7,171,154 B2 | 1/2007 | Fujisawa |
| 7,249,139 B2 | 7/2007 | Chuah |
| 7,266,522 B2 | 9/2007 | Dutta |
| 7,288,028 B2 | 10/2007 | Rodriquez et al. |
| 7,297,063 B2 | 11/2007 | Fujisawa |
| 7,314,407 B1 | 1/2008 | Pearson |
| 7,396,281 B2 | 7/2008 | Mendelsohn et al. |
| 7,425,169 B2 | 9/2008 | Ganz |
| 7,429,214 B2 | 9/2008 | Brase et al. |
| 7,442,108 B2 | 10/2008 | Ganz |
| 7,465,212 B2 | 12/2008 | Ganz |
| 7,488,231 B2 | 2/2009 | Weston |
| 7,534,157 B2 | 5/2009 | Ganz |
| 7,556,563 B2 | 7/2009 | Ellis et al. |
| 7,568,964 B2 | 8/2009 | Ganz |
| 7,591,703 B2 | 9/2009 | Zielinski et al. |
| 7,604,525 B2 | 10/2009 | Ganz |
| 7,618,303 B2 | 11/2009 | Ganz |
| 8,033,901 B2 * | 10/2011 | Wood .................... 463/1 |
| 2001/0031603 A1 | 10/2001 | Gabai et al. |
| 2002/0002514 A1 | 1/2002 | Kamachi et al. |
| 2002/0082077 A1 | 6/2002 | Johnson et al. |
| 2002/0160835 A1 | 10/2002 | Fujioka et al. |
| 2002/0161666 A1 | 10/2002 | Fraki |
| 2003/0126031 A1 | 7/2003 | Asami |
| 2004/0043806 A1 | 3/2004 | Kirby et al. |
| 2004/0053690 A1 | 3/2004 | Fogel et al. |
| 2004/0093266 A1 | 5/2004 | Dohring |
| 2004/0229696 A1 | 11/2004 | Beck |
| 2004/0242326 A1 | 12/2004 | Fujisawa et al. |
| 2005/0059483 A1 | 3/2005 | Borge |
| 2005/0137015 A1 | 6/2005 | Rogers |
| 2005/0177428 A1 | 8/2005 | Ganz |
| 2005/0250415 A1 | 11/2005 | Barthold |
| 2005/0250416 A1 | 11/2005 | Barthold |
| 2005/0272504 A1 | 12/2005 | Eguchi et al. |
| 2006/0093142 A1 | 5/2006 | Schneier et al. |
| 2006/0100018 A1 | 5/2006 | Ganz |
| 2006/0172787 A1 | 8/2006 | Ellis et al. |
| 2006/0293103 A1 | 12/2006 | Mendelsohn |
| 2007/0082720 A1 | 4/2007 | Bradbury et al. |
| 2007/0082738 A1 | 4/2007 | Fickie et al. |
| 2007/0087837 A1 | 4/2007 | Bradbury et al. |
| 2007/0087838 A1 | 4/2007 | Bradbury et al. |
| 2007/0087839 A1 | 4/2007 | Bradbury et al. |
| 2007/0088656 A1 | 4/2007 | Jung et al. |
| 2007/0129998 A1 | 6/2007 | Postrel |
| 2007/0226062 A1 | 9/2007 | Hughes et al. |
| 2008/0009351 A1 | 1/2008 | Ganz et al. |
| 2008/0032790 A1 | 2/2008 | Zielinski et al. |
| 2008/0039166 A1 | 2/2008 | Harris et al. |
| 2008/0081694 A1 | 4/2008 | Hong et al. |
| 2008/0109313 A1 | 5/2008 | Ganz et al. |
| 2008/0120558 A1 | 5/2008 | Nathan et al. |
| 2008/0134099 A1 | 6/2008 | Ganz et al. |
| 2008/0163055 A1 | 7/2008 | Ganz et al. |
| 2008/0221998 A1 | 9/2008 | Mendelsohn et al. |
| 2008/0261687 A1 | 10/2008 | Gatzios |
| 2008/0265509 A1 | 10/2008 | Gatzios |
| 2009/0053970 A1 | 2/2009 | Borge |
| 2009/0054155 A1 | 2/2009 | Borge |
| 2009/0063282 A1 | 3/2009 | Ganz |
| 2009/0069084 A1 | 3/2009 | Reece et al. |
| 2009/0116641 A1 * | 5/2009 | Bokor et al. .................... 380/44 |
| 2009/0131164 A1 | 5/2009 | Ganz |
| 2009/0204420 A1 | 8/2009 | Ganz |
| 2009/0318229 A1 | 12/2009 | Zielinski et al. |
| 2010/0269053 A1 * | 10/2010 | Lingafelt et al. .............. 715/757 |

FOREIGN PATENT DOCUMENTS

| | | |
|---|---|---|
| WO | 0102072 A1 | 1/2001 |
| WO | 01/69829 A2 | 9/2001 |
| WO | 0227591 A1 | 4/2002 |

OTHER PUBLICATIONS

Mark Ward, Virtual cash exchange goes live: BBC News Online, Jan. 7, 2004.

Grace, "Web Site Tycoon's Next Goal: Sixth Grade"; Woonsocket Call, Jun. 19, 2002.

http://web.archive.org.web.20031202190119/www.monopets.com/, Dec. 2, 2003.

"The Sims Booklet," dated 2000.

* cited by examiner

METHOD AND SYSTEM FOR PROVIDING A VIRTUAL PRESENTATION INCLUDING A VIRTUAL COMPANION AND VIRTUAL PHOTOGRAPHY

BACKGROUND OF THE INVENTION

1. Field of the Invention

This application relates generally to a system and method for providing a virtual presentation that promotes sales of a real-world product. More specifically, this application relates to an entertainment system including a website that includes a restricted portion to which access is granted in response to registration of a code associated with the real-world product once the real-world product has been purchased by a user.

2. Description of Related Art

Systems exist for providing a virtual presentation of a virtual world in which a virtual character represents a real-world toy, including our own U.S. Pat. No. 7,425,169. In this patent, a consumer purchases a toy (e.g., a stuffed plush animal or other creature, etc.) as a gift for a child, for example, and that child can play with the actual toy itself in the real world and the virtual character in the virtual world. Accordingly, there is a need in the art for a method and system for providing a virtual presentation that maintains a relationship with users, and creates opportunities to market products to the users.

BRIEF SUMMARY

The inventors recognized that a child may lose interest in the virtual world once the child has experienced much of what the virtual world has to offer, causing the child to discontinue regular visits to the virtual world and resulting in lost marketing opportunities. The loss of the child's interest in the virtual environment represents a lost opportunity to take advantage of the fact that the child likely wants to create a whole imaginative world for the toy for play purposes. Presenting the child with new portions of the virtual world will help to keep the child interested in the virtual world, extending the period during which future marketing opportunities can be explored. Further, such a virtual world could increase the attachment that the toy owner feels for the toy, and thus increases the likelihood that an additional toy or accessory purchases would occur, and also increase the satisfaction the child feels with the toy, thus extending the relationship between the toy manufacture and the toy owner.

According to one aspect, the subject application involves a method of providing a virtual presentation. The method includes using a computer system to represent a plurality of different groups of virtual objects within a virtual world on a display device, wherein at least one of the different groups is selectable by a user. The method also includes using the computer system to display the desired group of virtual objects within a virtual optical viewfinder, and excluding from the virtual optical viewfinder at least a portion of the different groups not selected by the user in response to an input from the user selecting a desired group of virtual objects from among the plurality of different groups. Using the computer system, a selection tool is provided within the virtual optical viewfinder, the selection tool being controllable by the user to select a target virtual object from the desired group of virtual objects displayed within the virtual optical viewfinder. And using the computer system, the user is presented with a magnified image of the target virtual object and revealing an identity of the target virtual object that has been selected in response to selection of the target virtual object by the user, wherein the identity of the target virtual object is concealed from the user before said selection.

According to another aspect, the subject application involves a method of creating and presenting a virtual collection in a virtual world. The method includes using a computer system to display a plurality of virtual objects to be collected within the virtual world on a display device, the virtual objects being classified in a plurality of different categories of virtual objects within the virtual world. Using the computer system, and in response to an input from the user selecting a target virtual object to be collected and added to the virtual collection associated with the user, the target virtual object is added to a virtual album within an appropriate category in which the target virtual object is classified, and a prize is awarded to the user in response to addition of the target virtual object to the virtual album. The user is presented with a gift in response to the user collecting all virtual objects in the appropriate category, wherein presentation of the gift comprises at least one of an audio component and a video component.

According to another aspect, the subject application involves a method of providing a virtual presentation, the method including using a computer system to represent a toy with a virtual character in the virtual world, the virtual character being controllable according to commands input by a user via the computer system. The method also includes using the computer system to provide a plurality of different virtual beings in the virtual world, wherein the user can select at least one of the virtual beings within the virtual world to be a virtual companion of the virtual character. In response to selection of the virtual companion by the user, the virtual companion is associated with the virtual character controlled by the user, and the virtual companion is displayed within a close proximity of the virtual character in the virtual world to establish a relationship between the virtual character and the virtual companion. The virtual character is moved to a desired location within the virtual world in response to commands input by the user, and the relationship between the virtual character and virtual companion is substantially maintained while the virtual character is moved.

According to another aspect, the subject application involves a method of providing a virtual presentation that includes using a computer system to grant a user access to a virtual character within a virtual world and allow the user to control movement of the virtual character within the virtual world. Using the computer system, an access code associated with a real-world toy possessed by the user is received and validated. In response to receiving and validating the access code, the user is to be granted access to a virtual companion for the virtual character, allowing the user to establish a relationship between the virtual character and the virtual companion by causing the virtual companion to be positioned in close proximity to the virtual character within the virtual world. The relationship between the virtual companion and the virtual character is substantially maintained following movement of the virtual character in the virtual world in response to an input from the user requesting movement of the virtual character.

According to another aspect, the subject application involves a method of providing a virtual presentation that includes using a computer system to grant a user access to a virtual character within a virtual world and allow the user to control movement of the virtual character within the virtual world. Using the computer system, the user is granted access to a virtual companion for the virtual character and a relationship between the virtual character and the virtual companion is established by displaying the virtual companion in close proximity to the virtual character within the virtual world.

The relationship between the virtual companion and the virtual character is substantially maintained after movement of the virtual character in the virtual world in response to an input from the user requesting movement of the virtual character. And the user is to be provided with a virtual dwelling for the virtual companion within the virtual world in which the user can elect to store the virtual companion within the virtual dwelling when the virtual companion is not displayed within close proximity to the virtual character.

According to another aspect, the subject application involves a method of providing a virtual presentation that includes using a computer system to granting a user access to a virtual character within a virtual world and allow the user to control movement of the virtual character within the virtual world. Access to a restricted portion of the virtual world is restricted to prevent the user from participating in an activity in the restricted portion that allows the user to attempt to select a virtual being displayed within the restricted portion of the virtual world. Using the computer system, an access code associated with a real-world object in possession of the user is to be received and validated. In response to receiving and validating the access code, the user is granted access to the restricted portion of the virtual world and allowing the user to participate in the activity by attempting to select the virtual being displayed within the restricted portion of the virtual world. The virtual being is to be displayed in another portion of the virtual world, other than the restricted portion of the virtual world, that was accessible to the user before granting access to the restricted portion of the virtual world, wherein the virtual being can be selected by the user in the another portion of the virtual world. A prize is awarded to the user in response to successful selection of the virtual being within the another portion of the virtual world.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 1:
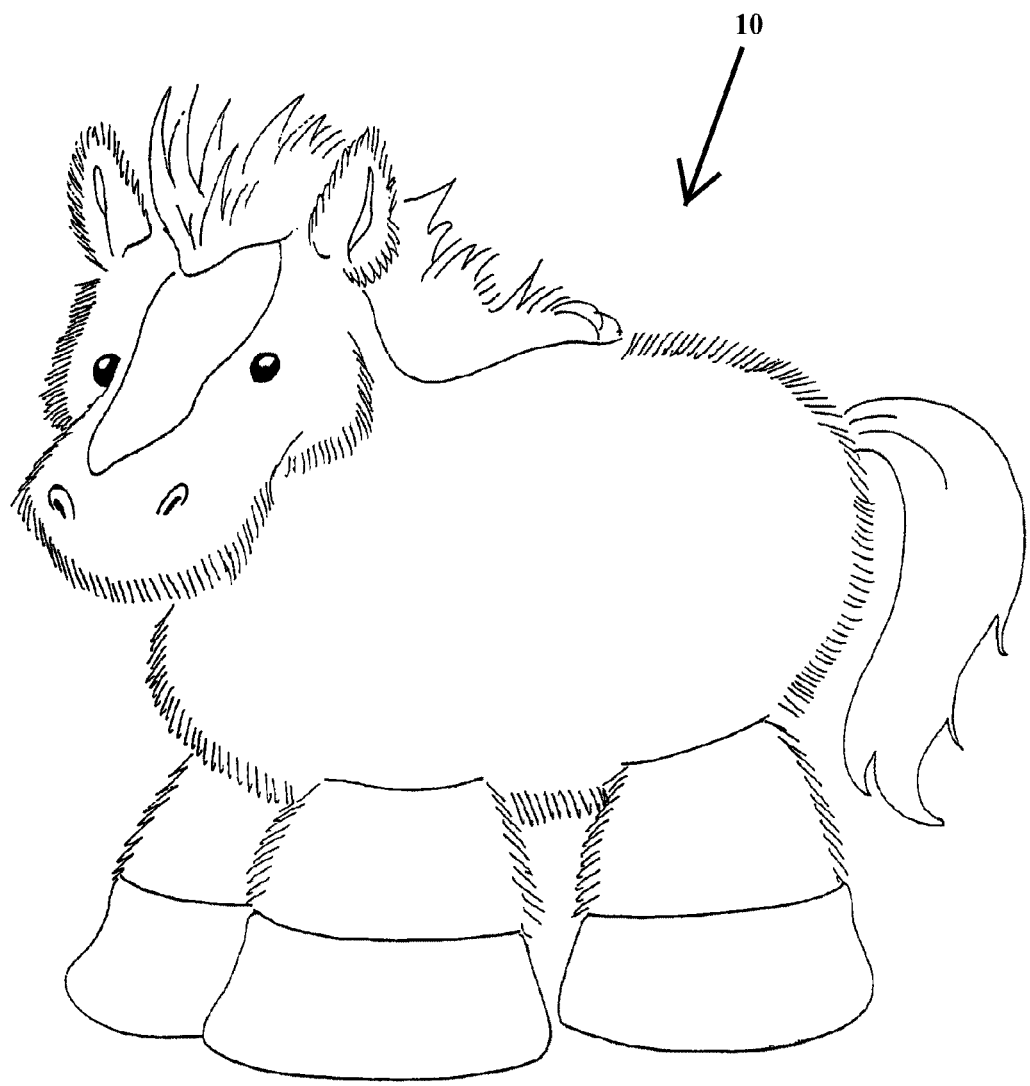
FIG. 1 shows an example of a real-world toy associated with a registration code.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

FIG. 1 shows an example of a real-world toy to be represented in a virtual world by a virtual replica of the toy. As shown, the toy 10 in FIG. 1 is a plush animal having the appearance of a horse. Although shown in a plush animal, the toy 10 can be any real-world object offered for the amusement of children such as playing cards, figurines, dolls, cars, robots, or other similar items.

Figure 2A:
FIGS. 2A and 2B shows an example of a tag to be associated with a real-world toy, the tag including a registration code and a URL of a website at which the registration code can be entered to be validated.
Figure 2B:
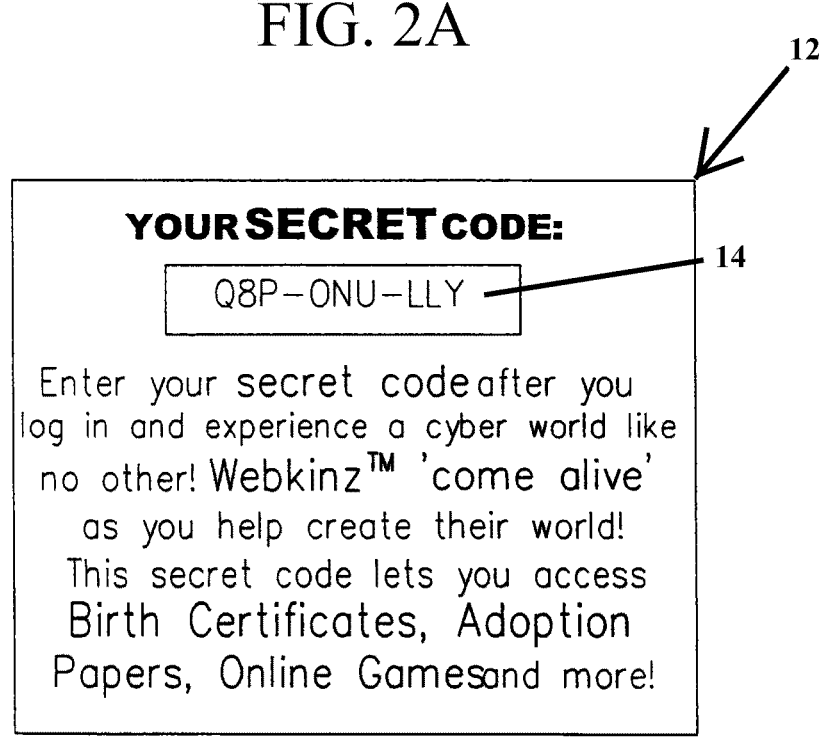

The toy 10 in FIG. 1 is provided with a tag 12 such as that shown in FIGS. 2A and 2B. The tag 12 can provide an introductory or instructional passage, and also includes a registration code 14 to be input into a website presented to the user via a computer system as described in detail below to provide a user with a virtual replica 28 (FIG. 5) of the toy 10 in a virtual world. The registration code 14 is shown in FIGS. 2A and 2B on a tag 12 accompanying the toy 10, however, alternate embodiments include a registration code 14 etched, printed, or otherwise provided to the toy 10 itself, or otherwise associated with the toy 10.

Figure 3:
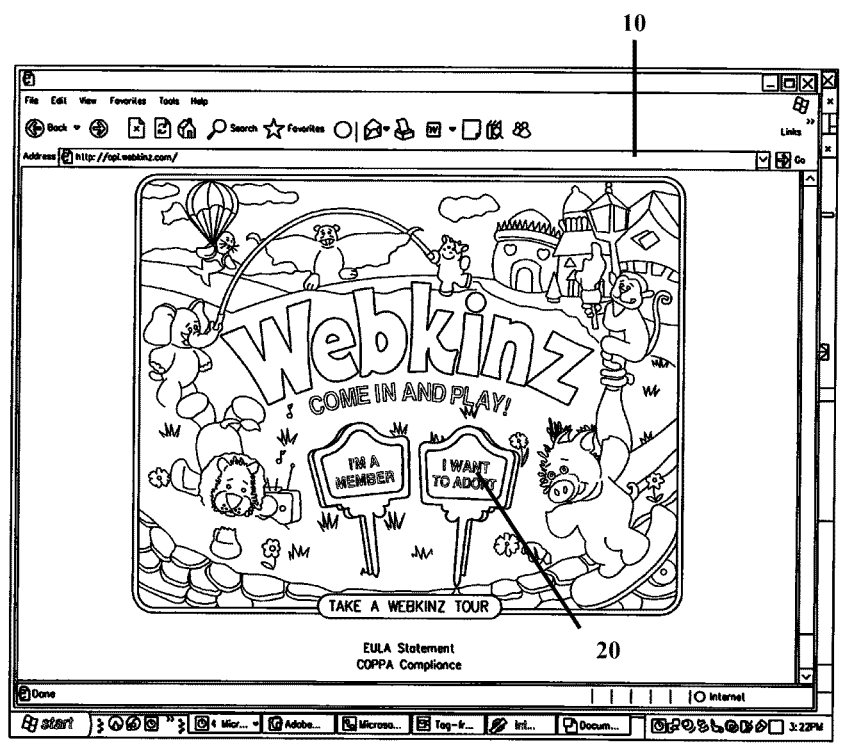
FIG. 3 shows an example of a splash screen of a website for adopting a virtual replica of a toy.

The tag 12 can optionally include the URL 16 of a website the user can retrieve over the Internet or other suitable communication network to register the toy 10 using the registration code 14 and gain access to the virtual replica 28 (FIG. 5) of the toy 10 in the virtual world. Using a user computer 38 (FIG. 6), the user can open a web browser application such as Internet explorer, Firefox, etc. . . . and enter the URL 16 into an address field 18, thereby causing the user computer to retrieve the website corresponding to that URL 16 as shown in FIG. 3. The user can elect to adopt the virtual replica of the toy 10 by selecting the adoption menu option 20 with a mouse or other input peripheral operatively connected to the user computer. When a virtual replica is adopted, a user account associated with both the adopted virtual replica and the user is created.

Figure 4:
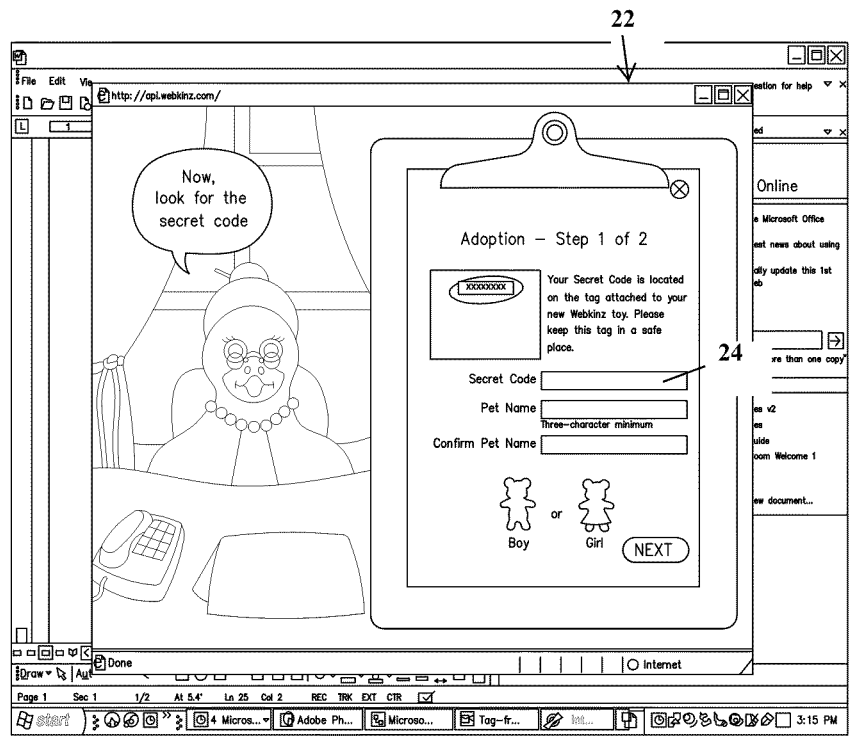
FIG. 4 shows an illustrative embodiment of an adoption interface including a code entry field for entering a registration code associated with a toy.

The adoption interface 22 shown in FIG. 4 is displayed by the user computer in response to the user's selection of the adoption menu option 20. The adoption interface 22 presents the user with various input fields including a code entry field 24 in which the user can enter one or more registration codes 14 displayed on tags 12 associated with toys 10 as shown in FIG. 2B. In response to the user entering the registration code 14 into the code entry field 24 and selecting a submission button 26, the registration code 14 can be transmitted to a remotely-located server 36 (FIG. 6) to be validated as a precursor to granting the user access to a virtual replica of the toy 10 within the virtual world.

Figure 5:
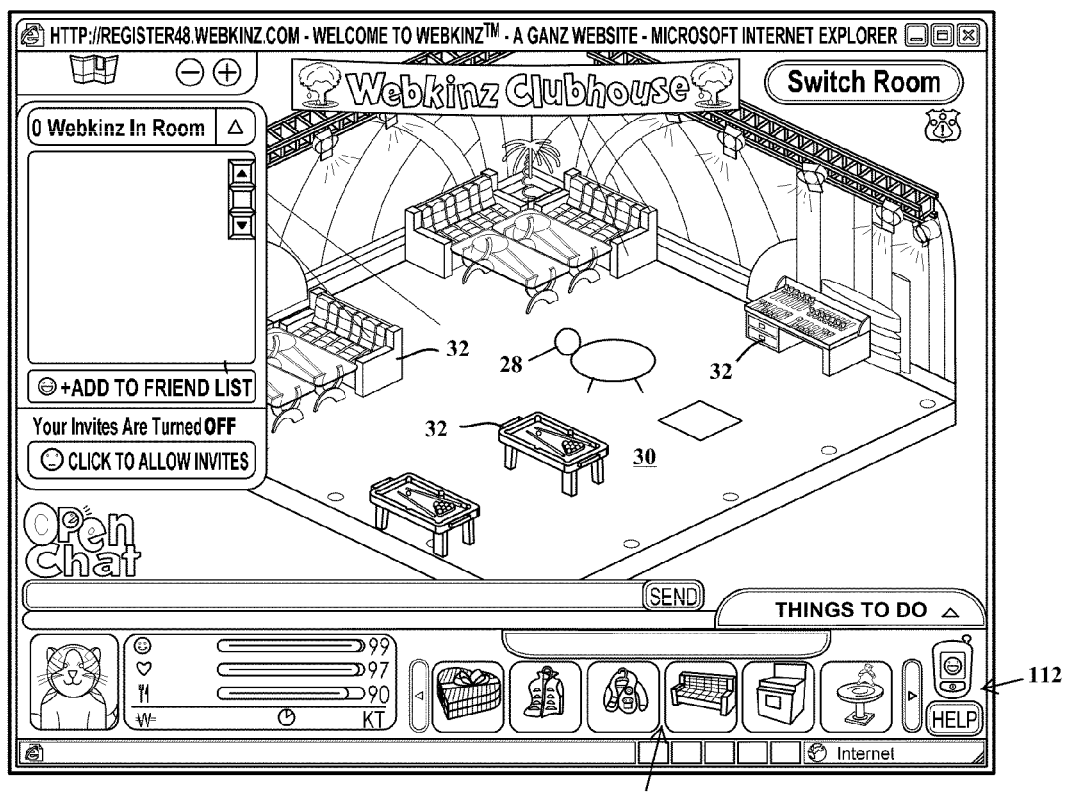
FIG. 5 shows an illustrative embodiment of a virtual replica of a toy within a virtual room associated with the virtual replica of the toy.

In response to validation of the registration code 14, the virtual replica 28 of the toy 10 can be presented in a virtual room 30 associated with the virtual replica 28, as shown in FIG. 5. The virtual room 30 can include pieces of virtual furniture 32 that the virtual replica 28 can interact with in response to control operations input by the user into the user computer 38. The virtual room 30 is included within a virtual world that the user can navigate with the virtual replica 28 can be presented with various audio and or video animations to enhance the user's experience within the virtual world. An example of such a virtual world is disclosed in U.S. Pat. No. 7,425,169 to Ganz, which is incorporated in its entirety herein by reference.

FIG. 5 also illustrates an example of a primary dock area 112 displayed along a bottom portion of the virtual room 30. The primary dock area 112 can be considered to be a control center from where the user can access various virtual items associated with the user's account that can be placed within the virtual room 30, virtually fed to the virtual replica 28, or otherwise used in the virtual world in conjunction with the virtual replica 28. A virtual inventory 111 of the virtual items associated with the user account that can be accessed and used anywhere within the virtual world is also displayed within the primary dock area 112. According to alternate embodiments, the virtual items included within the virtual inventory 111 are accessible by the user only when the virtual replica 28 is within an unrestricted portion of the virtual world, and not in a restricted portion of the virtual world as described below. The virtual items according to such embodiments can optionally remain inaccessible to the user within the previously restricted portion of the virtual world, even after the user has unlocked, and gained access to the restricted portion of the virtual world. The primary dock area 112 also includes a variety of information about the virtual replica 28 being controlled by the user, such as the health 27a, hunger 27b and happiness 27c of the virtual replica 28.

Figure 6:
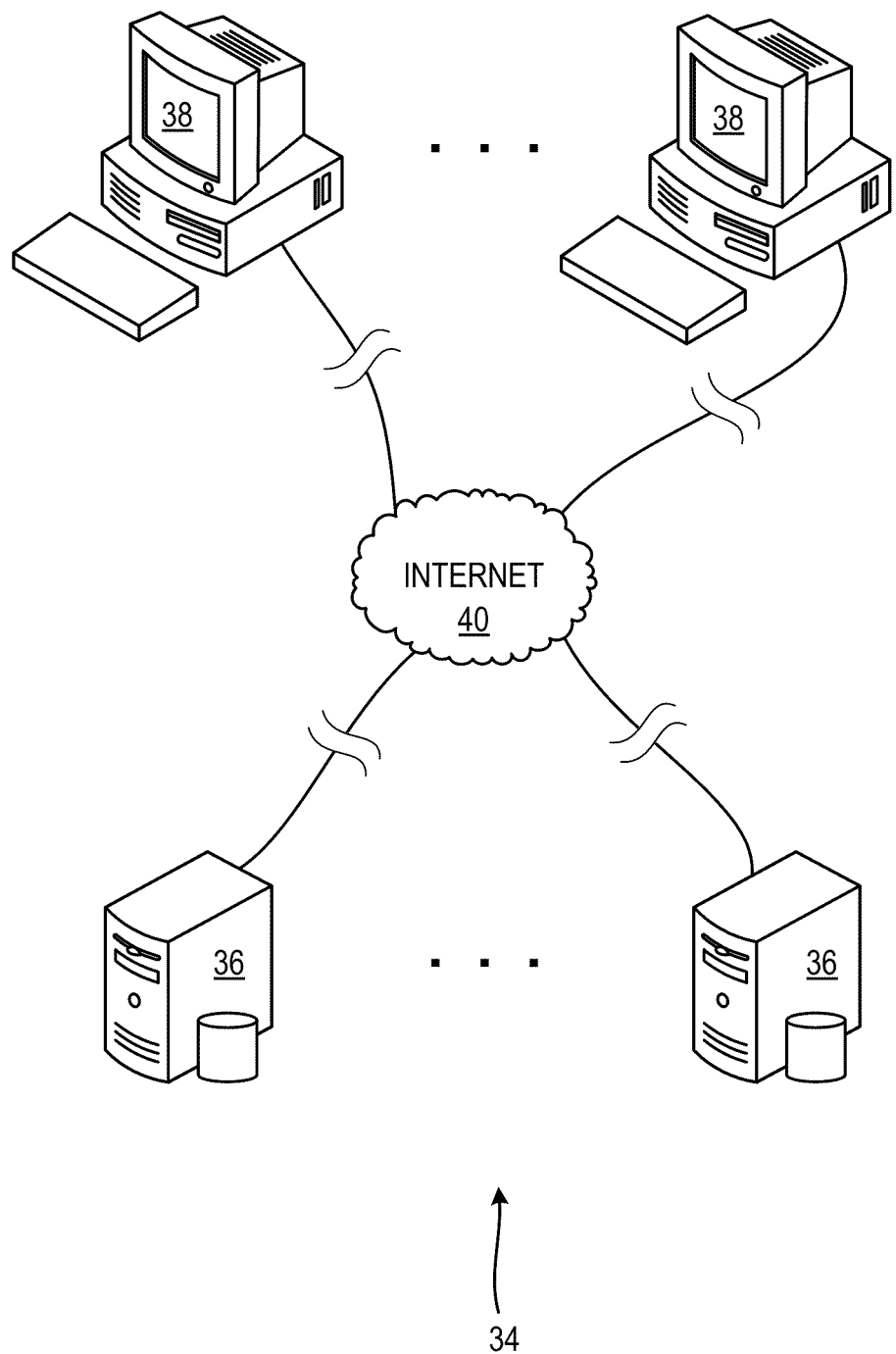
FIG. 6 shows an illustrative arrangement of a computer system comprising at least one user computer operatively connected to communicate with a server over a communication network.

FIG. 6 shows an illustrative embodiment of a computer system 34 for presenting the virtual world to the user and carrying out other operations discussed herein. As shown, the computer system 34 includes at least one server 36 storing content to be served to at least one user computer 38 via a communication network such as the Internet 40. A separate server 42 can optionally be used to receive data indicative of the registration code 14 input by the user into the computer system 34 via the adoption interface 22 portion of the website corresponding to the URL 16. The separate server 42 can optionally perform various operations for validating the registration code 14. According to alternate embodiments, validation of the registration code 14 can optionally be performed on the same server 36 that serves content used for generating the virtual world. As described above, registration of the toy 10 to gain access to the virtual replica 28 was accomplished via a web-based application that involved retrieval of the various displays presented by the user computer 38 from a remotely-located server 36. However, according to alternate embodiments, any portion of the content described herein for generating the virtual world to be presented to the user can be retrieved locally from the user computer 38 itself, can be retrieved remotely from the server 36, or a combination thereof. Thus, generation of the virtual world and features appearing therein will be described below as being performed by the computer system 34.

Figure 7:
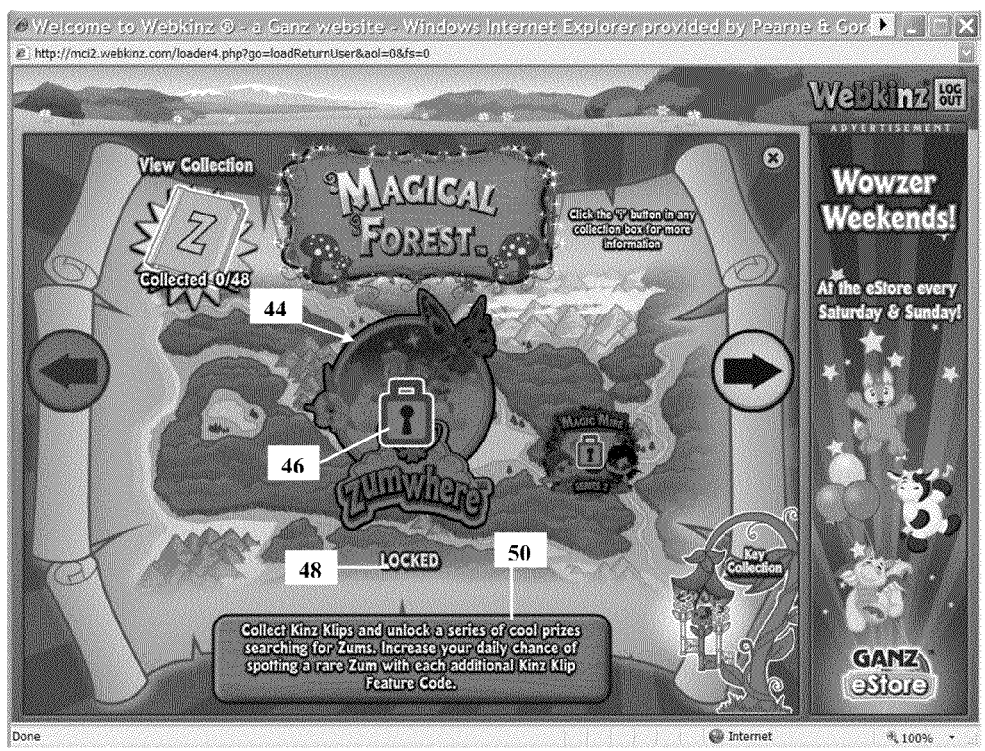
FIG. 7 shows an illustrative example of an entrance to a restricted portion of a virtual world.

At least a subset of the virtual world can be restricted from being accessed by the user until a predetermined condition has been satisfied. As shown in FIG. 7, access to a portion of the virtual world referred to herein as "Zumwhere" 44 is restricted, meaning that the user is unable to fully access the content appearing in Zumwhere 44 until the predetermined condition is satisfied. A virtual lock 46, a textual descriptor 48, or other suitable icon can be used to indicate to the user whether a portion of the virtual world is restricted or unrestricted. Alternate embodiments also include an instructional passage and 50 indicating the predetermined condition that must be satisfied before access is granted to the restricted portion of the virtual world.

When a portion of the virtual world, such as Zumwhere 44 for example, is restricted, the user is unable to fully access all content and/or fully participate in activities available in that restricted portion. For example, users may be permitted to enter Zumwhere 44 or other restricted portions and be presented with a preview of the content available therein. According to alternate embodiments, users may be permitted to partially participate in an activity available within a restricted portion of the virtual world, to an extent less than full participation in that activity by the user once the predetermined condition has been satisfied. For instance, a user may be granted access to one or more levels, but less than all levels, of a multi-level game. When the predetermined condition is satisfied to unlock the previously-restricted portion of the virtual world, the user is then granted access to all levels of the multi-level game. Alternate embodiments include imposing a time limit for participation in activities available in restricted portions of the virtual world until the predetermined condition is satisfied.

For the embodiment shown in FIG. 7, a user is required to enter a registration code similar to the registration code 14 appearing on the tag 12 in FIG. 2B into a code entry field. For example, a charm referred to as a "Kinz Klip" for accessorizing a bracelet, necklace, bookbag, etc. . . . ; a plush toy; or any other desired real-world object associated with a registration code is to be acquired by the user, and the registration code entered into a website displayed by the user computer 38 to be validated. In response to successful validation of the registration code associated with the Kinz Klip, for example, the computer system 34 unlocks Zumwhere 44 and grants the user access to the previously-restricted portions thereof.

Granting access to the restricted Zumwhere 44 in response to successful validation of a registration code associated with a real-world object encourages purchases of such real-world objects in addition to the purchase of the toy 10. Thus, the real-world object associated with the registration code to be validated in order to gain access to a restricted portion of the virtual world is separate from, and in addition to the toy 10 with the registration code 14 registered to initially gain access to the virtual world in the first place. A subsequently acquired real-world object can be associated with the registration code that grants access to the restricted portion of the virtual world. This item can be another toy 10 with another registration code 14 that can be validated to initially gain access to the virtual world, an accessory for the toy 10, a charm or other item of jewelry, a different toy that is unrelated to the toy 10 registered to gain access to the virtual world, or any other desired real-world object.

Objects referred to as being "real-world" objects herein are physical, tangible toys or other such objects that can make physical contact with a living person outside of the virtual world that is hosted by the computer program. In contrast, objects or items described herein as being "virtual" items, such as the virtual replica 28 for example, are used herein to refer to computer-generated objects and items that exist within the virtual world presented to the user by the computer system 34. Thus, references to "virtual currency" herein refer to currency that exists within the virtual world, that is optionally not legal tender issued by a government authority for real-world transactions in a geographic area of the real world.

Figure 8:
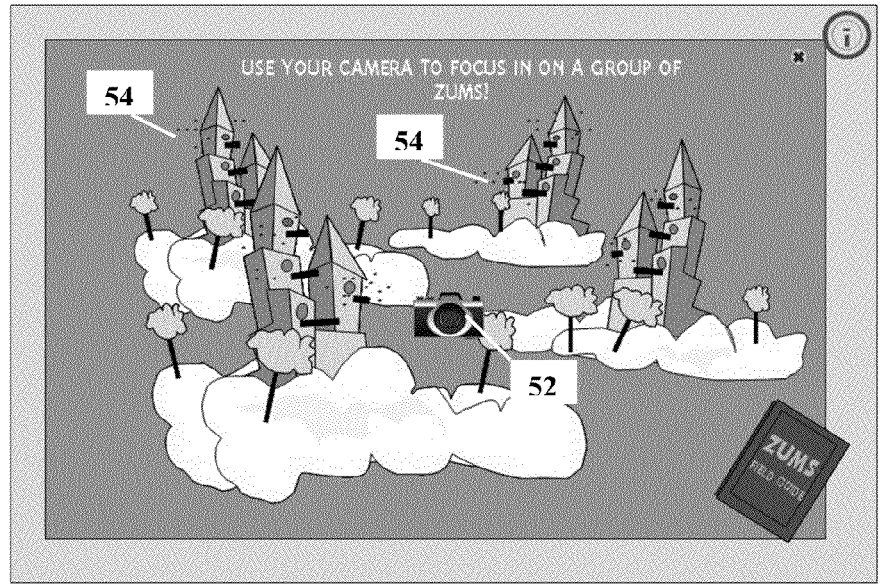
FIG. 8 is an illustrative embodiment of a distant view of potential subjects for a virtual photography activity.

Upon gaining access to Zumwhere 44, the user is presented with an opportunity to participate in a virtual photography activity, which can optionally be an activity to which access was restricted prior to validation of the registration code associated with the Kinz Klip. A distant view of the virtual photography environment is illustrated in FIG. 8. In this view, a cursor 52 controlled by a mouse or other input peripheral provided to the user computer 38 has the general appearance of a camera. A plurality of different groups 54 of virtual objects also appear in the background of the distant view shown in FIG. 8. For the present environment, each group 54 appears as a swarm of virtual mythical creatures referred to herein as "Zums."

To select a desired group 54 of Zums from which the user wishes to photograph a Zum, the user positions the cursor 52 and clicks a mouse button or otherwise enters a command indicating the desired group 54 as the user's selection. In response to such a command, a zoomed-in view of the desired group 54 is displayed within a virtual optical viewfinder 56 such as that shown in FIG. 9 to be presented by the computer system 34 to the user. The virtual optical viewfinder 56 includes a reticle 58 to be positioned by the user as a selection tool through operation of a mouse or other suitable input peripheral provided to the user computer 38 on an individual Zum 59 in the desired group 54 that the user wishes to photograph. The reticle 58 is shown in FIG. 9 as including a circular target selector 60 for selecting the primary focus of the photograph.

Although the virtual optical viewfinder 56 of the illustrated embodiment resembles a camera viewfinder, the virtual optical viewfinder 56 can represent any desired optical, laser or other desired viewfinder such as binoculars, a telescope, a rifle scope, and the like. However, for the sake clearly describing a method and system for providing the virtual presentation, and embodiment including an optical viewfinder of a virtual camera will be discussed in detail below.

Figure 10:
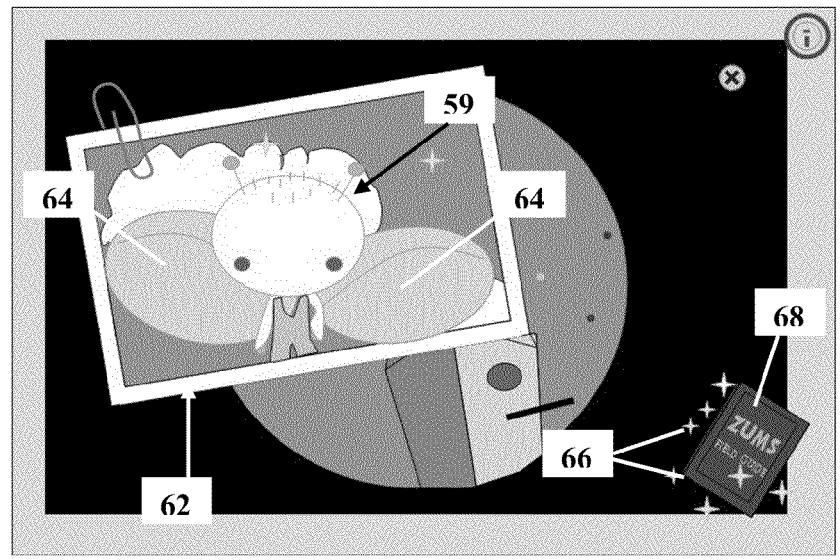
FIG. 10 shows an illustrative embodiment of a developed photograph of a Zum identifying an identity of the Zum to the user.

Each individual Zum 59 can optionally be animated, such as with a set of animated wings and moving about in the displayed optical viewfinder 56 for example, to give the Zum a lifelike appearance and present the user with a challenge to align the target selector 60 with the individual Zum 59 to be photographed. Once the user feels that the individual Zum 59 to be photographed is properly aligned with the target selector 60, the user can once again input a command via a suitable peripheral of the user computer 38 to take the photograph and thereby select the individual Zum 59 that was targeted. Operation of a virtual shutter such as that provided to conventional cameras can optionally be displayed by the computer system 34 to the user to affirmatively simulate the taking of a virtual photograph of the individual Zum 59. In response to selection of the individuals Zum 59, the computer system 34 presents the user with a developed virtual photograph 62 of the individual Zum 59 as shown in FIG. 10.

Figure 9:
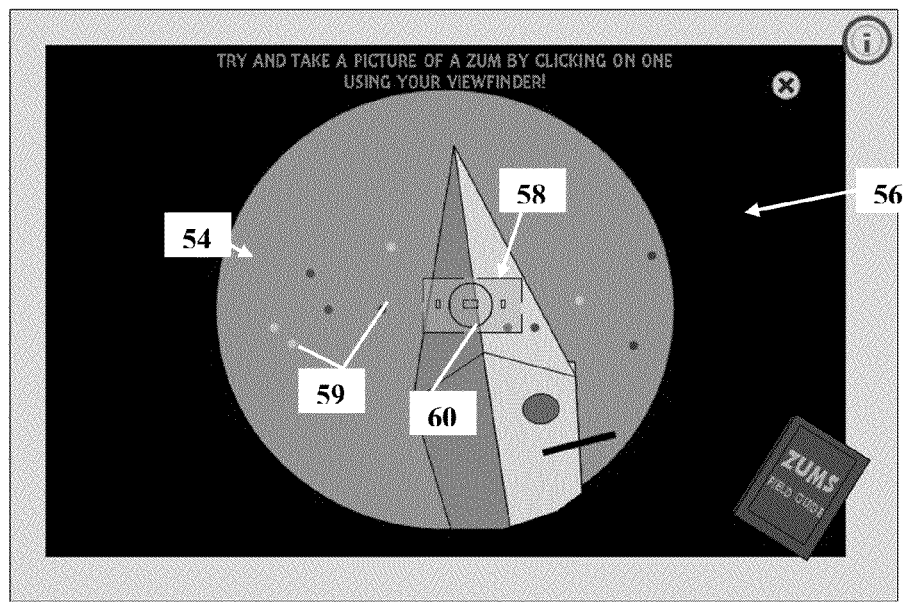
FIG. 9 is an illustrative embodiment of a zoomed-in view of a desired group displayed within a virtual optical viewfinder.

The individual Zum 59 appearing in the groups 54 of Zums in FIG. 8, and the individual Zums 59 appearing within the virtual optical viewfinder 56 in FIG. 9 cannot be identified by the user from those views. However, the individual Zum 59 appearing in the virtual photograph 62 shown in FIG. 10 reveals the identity of the individual Zum 59 to the user. As shown in FIG. 10, the individual Zum 59 appears as a fairy comprising a set of wings 64. Additionally, a notification including an audio and/or video component such as the presentation of animated stars 66 adjacent to a virtual photo album 68 can be presented to the user indicating that the virtual photo album 68 has been updated to include the newly-captured photograph 62. The virtual photo album 68 can be a virtual book and each virtual page in the virtual book can optionally be designated as a different section that is associated with a different category of Zum 59.

An embodiment of Zumwhere 44 includes a plurality of different prize types, or prize categories of individual Zums 59 that can be photographed, and successfully selecting members in the different prize categories of Zums 59 can result in different prizes being awarded to the user and associated with the user account. The probability of being awarded a particular prize by the computer system can be influenced by factors such as a quantity of the registration codes used to gain access to Zumwhere 44 that have been registered by the user. The greater the number of such registration codes registered the more likely the user is going to be awarded a relatively valuable, and optionally rare prize. For example, a table can be stored which has a probability of being awarded a prize. This probability can increase as a function of the number of registration codes.

Figure 11A:
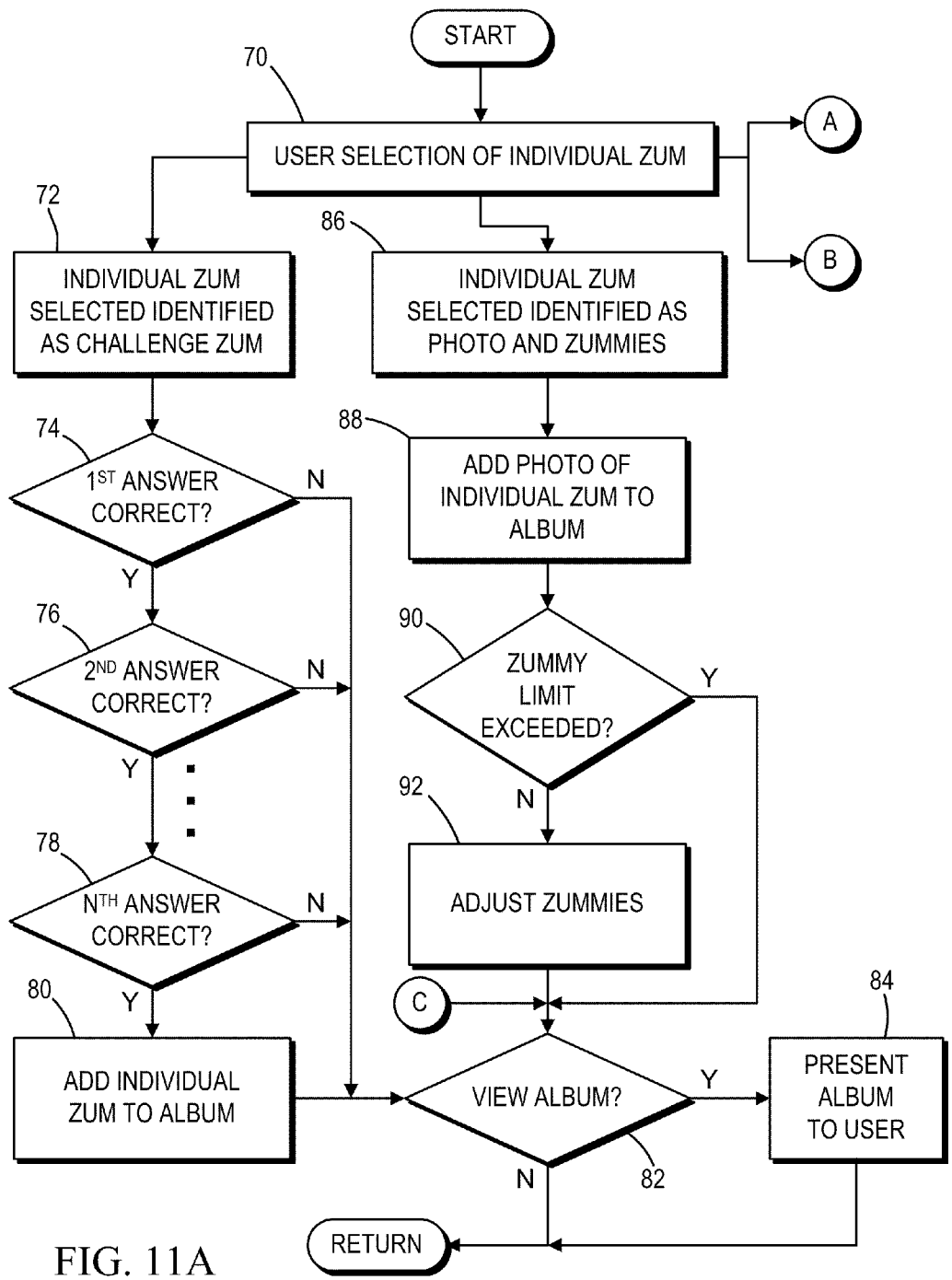
FIGS. 11A and 11B illustrate an example method of awarding a prize to a user in response to a selection of a target Zum in a virtual world.
Figure 11B:
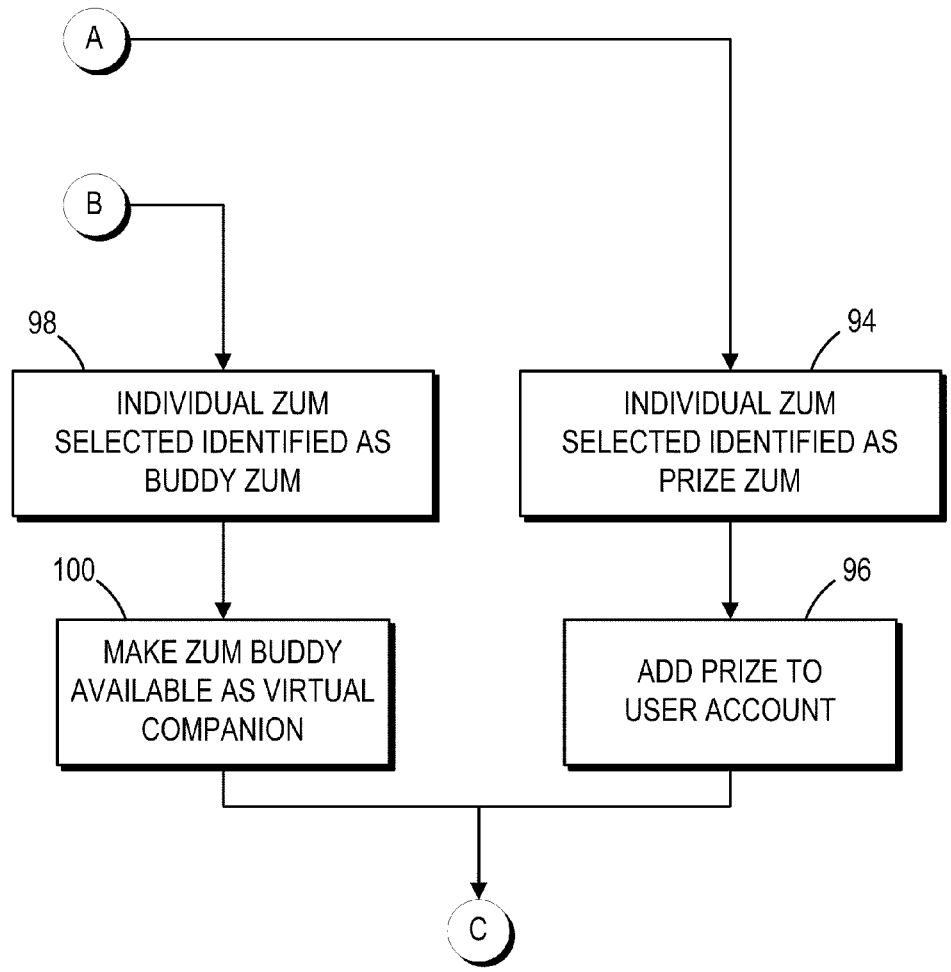

The method of capturing members of different prize categories of Zums 59 can be understood with reference to FIGS. 11A and 11B. At step 70, the user selects the individual Zum 59 within the optical viewfinder 56 as described above. If the individual Zum 59 selected is determined to be one of the "Challenge Zums" at step 72 the virtual photograph 62 such as that shown in FIG. 10 is not immediately developed and presented to the user to reveal the identity of the individual Zum 59 selected. Instead, the user is presented with one or a plurality of challenges that must be successfully completed in order to cause the computer system 34 to reveal which of the Challenge Zums 59 has been selected and award the user a prize. If it is determined at step 74, and optionally 76 and 78 that each of the presented challenges has been successfully completed, then the photograph 62 of the individual Zum 59 selected is added to the virtual photo album 60 as the prize at step 80.

If it is determined at any of steps 74, 76 and 78 that the user has failed to successfully complete one of the presented challenges, the virtual photograph 62 does not get developed to reveal the identity of the selected Zum 59 to the user. Alternate embodiments can include revealing the identity of the selected Zum 59 in response to a failure to successfully answer a presented challenge, but not including a virtual photograph 62 of the selected Zum 59 in the virtual photo album 68. But if it is determined at any of steps 74, 76 and 78 that the user has failed to successfully complete one of the presented challenges, or after all challenges have been successfully completed and the virtual photo album 68 updated at step 80, the user is presented the option to view the virtual photo album 68 at step 82. If the user elects to view the virtual photo album 68 it is presented to the user by the computer system 34 at step 84 before returning. If, however, the user elects not to view the virtual photo album 68 at step 82, the process returns without the virtual photo album 68 being presented to the user.

The challenges presented to the user that must be successfully completed in response to selection of a Challenge Zum can be any activity requiring thoughtful responses on the part of the user. For example, the challenges can include one or more of a: trivia question, puzzle, math question, and the like. Such challenges can optionally be intended for user ages of 15 or younger.

Figure 18:
FIG. 18 shows an illustrative embodiment of an award of virtual currency within two different classes of virtual currency.

If, instead of a Challenge Zum, it is determined at step 86 that the prize type of the Zum 59 selected is a "Photo Zum," then the photograph 62 of the individual Zum 59 selected is added to the virtual photo album 68 at step 88 simply in response to selection of the Photo Zum. Adding the photograph 62 to the virtual photo album 68 is not contingent upon satisfying a predetermined condition such as successfully completing a challenge, for example, other than selecting the photograph of the Photo Zum. Virtual currency that is not legal tender, also interchangeably referred to herein as "Zummies," can optionally also be awarded in response to selection of a Photo Zum. An example of an award of such virtual currency is illustrated in FIG. 18. However, the computer system 34 can optionally impose an upper limit on the quantity of such virtual currency that the user can be in possession of at any given time. Thus, at step 90 of FIG. 11A it is determined whether the user's account comprises less than the allowable quantity of Zummies, and optionally whether the user account comprises less than the allowable quantity of Zummies in a plurality of different Zummy categories. If so, at step 92 the quantity of Zummies associated with the user's account is updated to include the newly awarded amount, not to exceed the upper limit. If not, however, the virtual photo album 68 can still be updated with the photograph 62 of the newly selected individual Zum 59 without also awarding the additional prize of Zummies. Once again, the user is presented the option at step 82 to view the virtual photo album 68 as updated with the addition of the photograph 62 of the newly-selected Photo Zum.

Figure 19:
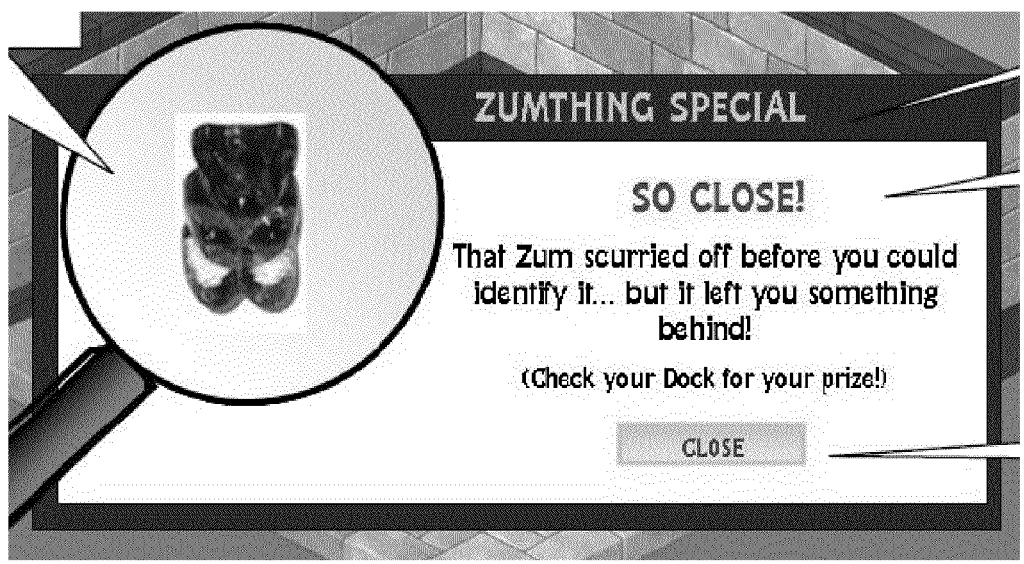
FIG. 19 shows an illustrative embodiment of an award of a consolation prize to the user in response to failing to select a Zum that briefly appeared in the virtual world.

Another example of a different type of prize awarding Zum 59 that can be selected is a "Prize Zum." A Prize Zum, unlike the other individual Zums 59, is actually a near miss or other failure to accurately capture a photograph 62 of an individual Zum 59. If at step 94 it is determined that the individual Zum 59 was a Prize Zum, a randomly-selected prize is awarded to the user as a consolation prize for failing to capture a photograph 62 of an individual Zum 59 as illustrated in FIG. 19. The randomly-selected prize can include any virtual object that can be purchased with virtual currency by the user in the virtual world, or any other virtual item other than virtual currency that can be associated with a user account. Specific examples include a piece of virtual furnishing, virtual food items, virtual clothing, virtual toys that the virtual replica 28 can play with in the virtual room 30, and the like. Other examples can include any of the virtual objects discussed the U.S. Pat. No. 7,425,169 to Ganz, which is incorporated in its entirety by reference herein. Such a prize is then added to the user account at step 96 and once again the users presented the option to view the virtual photo albums 68. Since a photograph of an individual Zum 59 has not been captured, the virtual photo album 68 is not updated to include a new virtual photograph.

Yet another embodiment of the type of prize awarded in response to selection of a different prize type of Zum 59 includes a "Buddy Zum." At step 98 is determined to that the individual Zum 59 selected is one of the Buddy Zums. The prize awarded to the user and associated with the user account in response to selection of the Buddy Zum is a virtual companion 102 (FIG. 12) for the virtual replica 28 being controlled in the virtual world by the user. The virtual companion 102 is a virtual being that can be displayed by the computer system 34 as accompanying the virtual replica 28 while the virtual replica 28 is being controlled by the user in the virtual world. At step 100 the virtual companion 102 is made available to the user, and optionally associated with the user account and placed in a menu of virtual objects associated with the user from where it can be selected and provided to the virtual replica 28 by the user.

Figure 12:
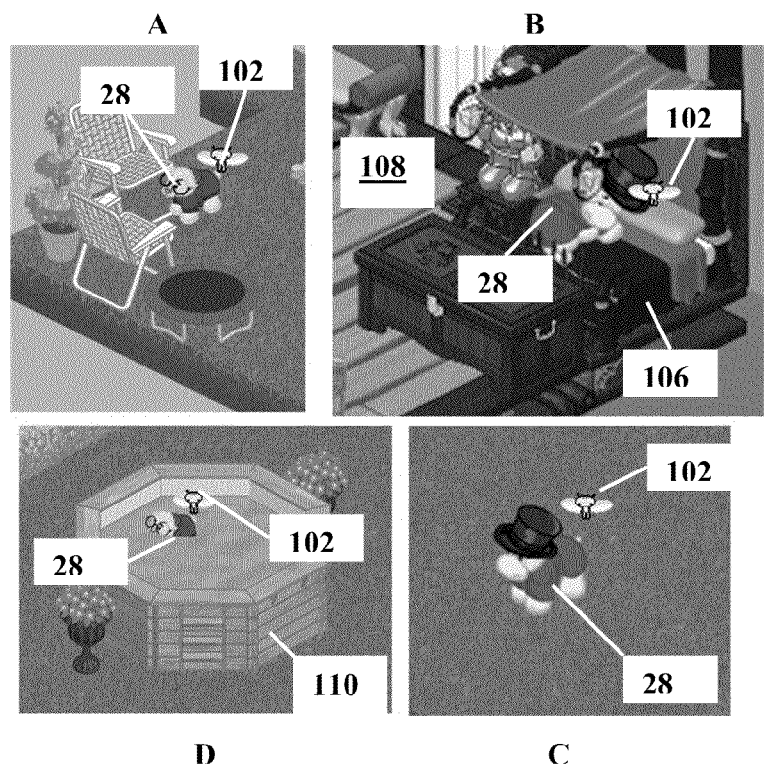
FIG. 12 shows four illustrative embodiments of a virtual companion accompanying a virtual replica of a toy in a virtual world.

Various embodiments of the virtual character 28 provided with a virtual companion 102 are illustrated in FIGS. 12(A-D). The virtual companion can optionally be provided to accompany the virtual replica 28 only in the portion of the virtual world in which the photograph of the Buddy Zum was captured, which is a previously-restricted portion of the virtual world that the user gained access to as described above. Yet other embodiments include providing the virtual companion 102 to accompany the virtual replica 28 only in the unrestricted portions of the virtual world. According to yet other embodiments, the virtual companion 102 can optionally accompany the virtual replica 28 anywhere within the virtual world, including in both the restricted portion (after access to this portion has been granted) and the unrestricted portion. As shown in FIGS. 12(A) and (C) the virtual replica 28 is displayed in an outdoor-specific virtual room 104, an unrestricted portion of the virtual world, with the virtual companion 102 hovering overhead. In FIG. 12(B) the virtual replica 28 is shown sleeping in a virtual bed 106 any virtual bedroom 108 with the virtual companion 102 hovering nearby. The virtual replica 28 in FIG. 12(D) is shown swimming in a virtual swimming pool 110 all the virtual companion 102 hovers above the virtual replica 28. As the virtual replica 28 makes its way around the virtual swimming pool 110 the virtual companion 102 follows closely along. One or both of the virtual replica 28 and the virtual companion 102 can optionally be animated while the virtual replica 28 is swimming in the virtual swing pool 110.

According to alternate embodiments, when accompanying the virtual replica 28, the virtual companion 102 can optionally include an animation component such as set of wings 64 (FIGS. 10 and 13) that flap, hovering adjacent to the virtual replica 28 within the virtual world, being coupled to the virtual replica 28 such as by resting on the shoulder of the virtual replica 28, or otherwise displayed with close proximity of the virtual replica 28 within the virtual world. As the virtual replica 28 is controlled to move about the virtual world such as in the virtual room 30 of FIG. 5, the close proximity between the virtual companion 102 and the virtual replica 28 is maintained during said movement. Further, as the virtual replica 28 is moved from a first position in the virtual room 30 to a second position in the virtual room 30, both the virtual replica 28 and the virtual companion 102 can optionally exhibit animation during said movement.

When the virtual companion 102 is not accompanying the virtual replica 28 the user may return the virtual companion 102 to the inventory 111 of virtual items appearing in the primary dock area 112 shown in FIG. 5, from where the virtual replica 102 can subsequently be retrieved once again and placed within close proximity to the virtual replica 28. Other embodiments have the virtual companion 102 being returned to a secondary dock area 200 (described below with reference to FIG. 26) that is only accessible to the user when the user is navigating the restricted portion of the virtual world to which access has been granted. Such embodiments can also optionally render the virtual inventory 111 of items in the primary dock area 112 inaccessible to the user while the user is navigating the previously restricted portion of the virtual world.

Figure 13:
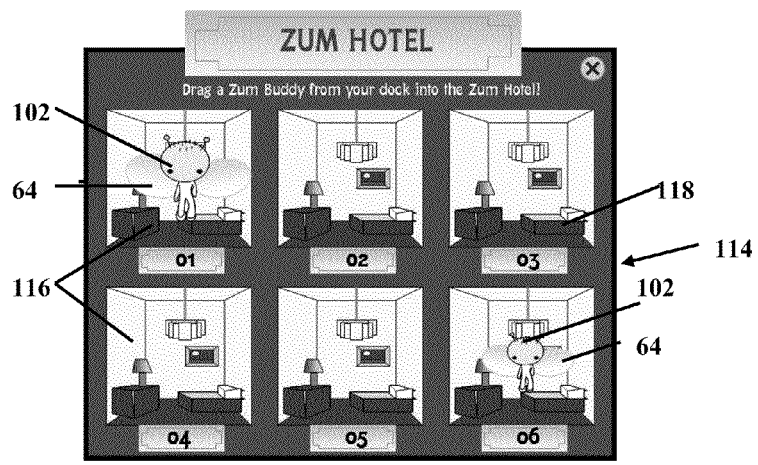
FIG. 13 shows an illustrative embodiment of a multi-unit virtual display case for housing a plurality of virtual companions when the virtual companions are not accompanying a virtual replica of a toy in a virtual world.

Yet other embodiments include storing the virtual companion 102, or plurality of virtual companions 102, in a virtual display case 114 such as that shown in FIG. 13. The virtual display case 114 is itself a virtual furnishing that can be arranged by the user in the virtual room 30 associated with the virtual replica 28. According to embodiments where a plurality of virtual companions 102 are to be stored in the virtual display case 114 when not accompanying the virtual replica 28, the virtual display case 114 can be partitioned into a plurality of individual companion rooms 116 that can each optionally include at least one piece of virtual furnishing 118 for the virtual companion 102. Arranged in this manner, the partitioned virtual display case 114 can resemble a virtual hotel or other multi-unit dwelling for the virtual companions(s) 102. Each virtual companion 102 can optionally be animated within the virtual display case 114. For example, the virtual companions 102 optionally flap their wings 64 and appear to hover within their respective rooms of the virtual display case 114.

The virtual display case 114 can optionally be made available for purchase by the user at a virtual store within the virtual world using virtual currency. In this manner, the virtual display case 114 can be purchased and arranged within the virtual room 30 by the user. Each virtual companion 102 not presently accompanying the virtual replica 28 can then be displayed in the virtual display case 114 within the virtual room 30 to be viewed by users controlling other virtual replicas that are visiting the virtual room 30 associated with the virtual replica 28.

According to alternate embodiments, the virtual display case 114 can be awarded to the user and stored in the user's account in response to validation of another registration code in a manner similar to the validation of the registration code 14 discussed above with regard to FIG. 2B. For example, the user may purchase a real-world plush toy that physically resembles a virtual companion 102 that can accompany the virtual replica 28 in the virtual world. The registration code associated with the plush toy resembling the virtual companion 102 can be entered into the website accessible with the URL discussed above and subsequently validated by the server 36. In response to successful validation of this registration code, the user can be awarded the virtual display case 114 to be arranged within the virtual room 30 associated with the virtual replica 28. The virtual display case 114 can optionally be awarded in response to validation of a registration code associated with the first plush toy resembling the virtual companion 102 registered by that user. Alternate embodiments involve awarding the user the virtual display case 114 for registering another registration code associated with a toy such as a plush animal representing the first virtual companion 102 beyond the capacity of the virtual display case 114 already associated with the user's account. Thus, if the first virtual display case 114 associated with the user's account can simultaneously house six virtual companions 102 an additional virtual display case 114 can be awarded to the user in response to validation by that user of the seventh registration code associated with a plush toy resembling a virtual companion 102.

Yet alternate embodiments involve awarding the user a virtual display case 114 in response to validation of a registration code associated with a real-world display case that is associated with a registration code. The real world toy can optionally be purchased by the user or on behalf of the user using legal tender. The registration code associated with this real-world toy, which can resemble the virtual display case, can be entered by the user via the website in a manner analogous to that discussed above to transmit the registration code 14 to the server 36 to initially gain access to the virtual world. In response to successful validation of this registration code, a virtual display case 114 is awarded to the user and stored in the user's account to be arranged in the virtual room 30 associated with the virtual replica 28. According to such an embodiment, the user is afforded the opportunity to store the real-world toys resembling the virtual companions 102 in the real-world display case and store the virtual companions 102 within the virtual display case 114 in the virtual world.

Figure 27:
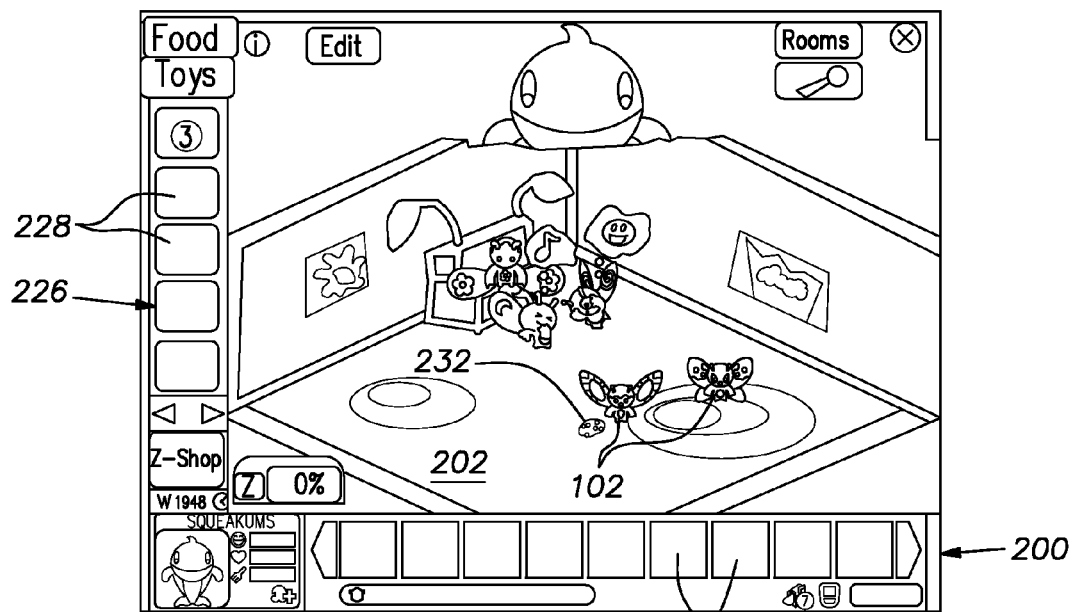
FIG. 27 shows an illustrative embodiment of virtual food placed within a virtual room associated with a virtual companion.

Instead of storing a virtual companion 102 in a virtual display case 114 when not accompanying the virtual replica 28, a secondary virtual room 202 for the virtual companions 102 such as that shown in FIG. 27 can be associated with the user account. According to such embodiments the virtual companion(s) 102 can be displayed together within the secondary virtual room 202, and can optionally interact with each other, the virtual contents of the secondary virtual room 202, the virtual replica 28 visiting the secondary virtual room 202, or a combination thereof.

A secondary virtual room 202 can be associated with the user account in response to registration of a registration code associated with a plush toy figure or other toy that is to be represented in the virtual world by the virtual companion 102. The user can also be granted access to the virtual companion 102 displayed within the secondary virtual room 202 as a result of this registration. An additional secondary virtual room 202 can be associated with the user account and made accessible to the user in response to registration of each of the first five (5) registration codes associated with the real-world plush toys to be represented by a virtual companion 102 within the virtual world. In other words, in response to registering the first five (5) registration codes associated with the plush toy figures to be represented by the virtual companions 102, there are five (5) secondary virtual rooms 202 associated with the user account in which the virtual companions can be displayed apart from accompanying the virtual replica 28. The virtual companions 102 can be displayed in the virtual replica's virtual room 30, but optionally only within a close proximity of the virtual replica 28 as a virtual companion. After the first five (5) or other predetermined number of secondary virtual rooms 202 are associated with the user account, an additional secondary virtual room 202 can be associated with the user account and made accessible to the user in response to registration of registration codes associated with every five (5) plush toys to be represented by virtual companions 102 within the virtual world. In other words, the user account has associated with it five (5) secondary virtual rooms 202 upon the registration of five registration codes associated with the plush toy figures to be represented by the virtual companions 102. A sixth ($6^{th}$) secondary virtual room 202 can be associated with the user account in response to registration of the tenth ($10^{th}$) registration code associated with a plush toy to be represented by a virtual companion 102. Of course the number of secondary virtual rooms 202 associated with the user account can be based on any predetermined number of registration codes registered.

Figure 24:
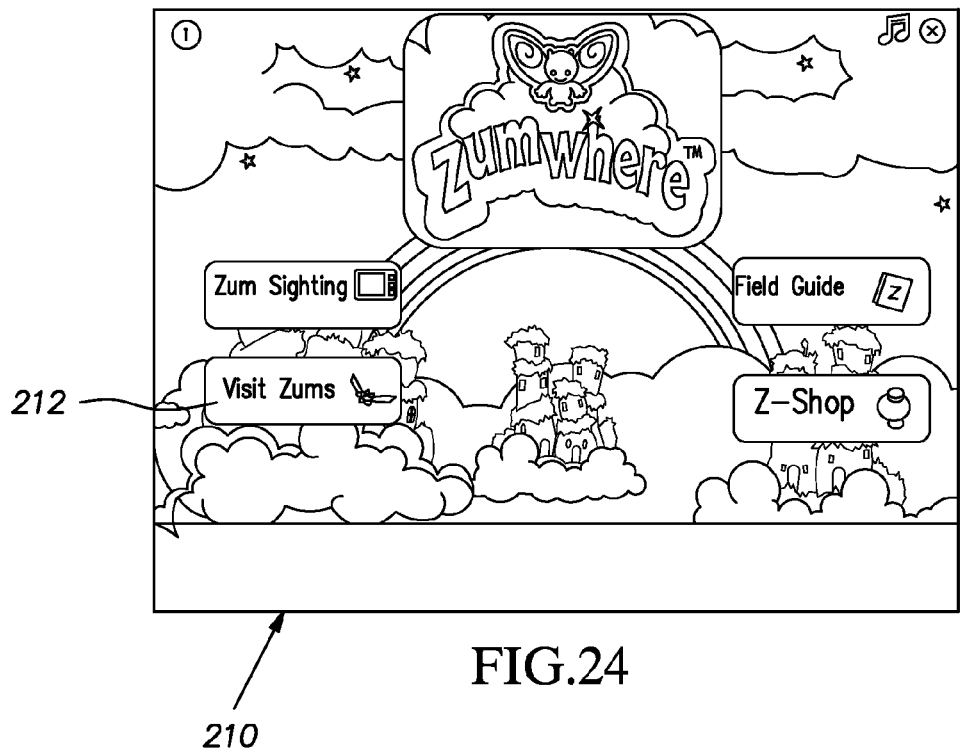
FIG. 24 shows an illustrative embodiment of a splash screen displayed upon entering a previously-restricted portion of a virtual world.
Figure 25:
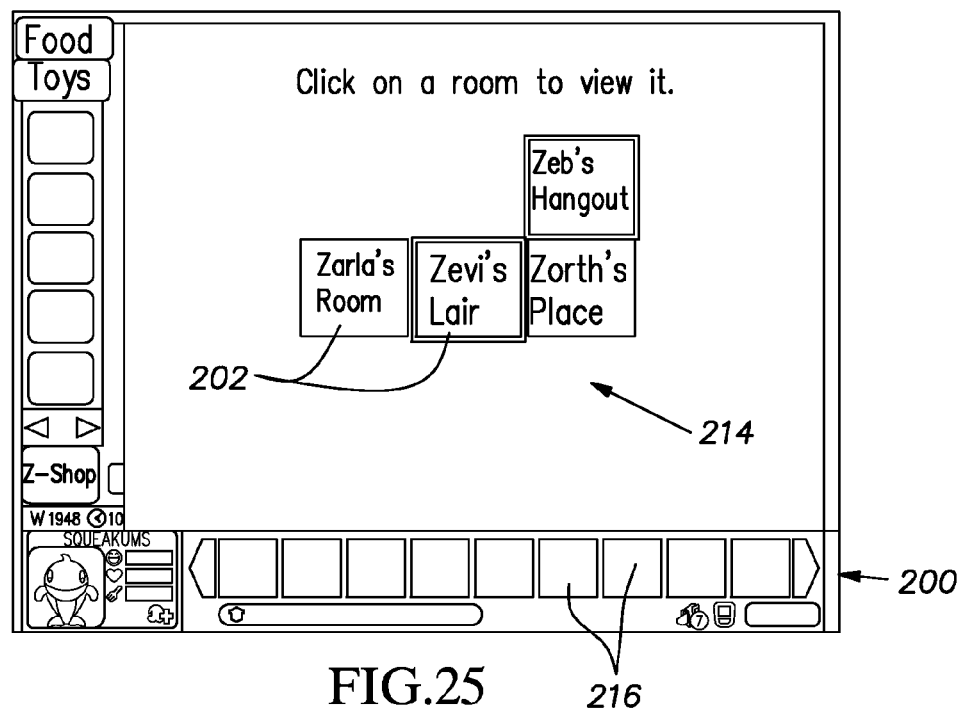
FIG. 25 shows an illustrative embodiment of a map of virtual rooms associated with virtual companions for a virtual character.
Figure 26:
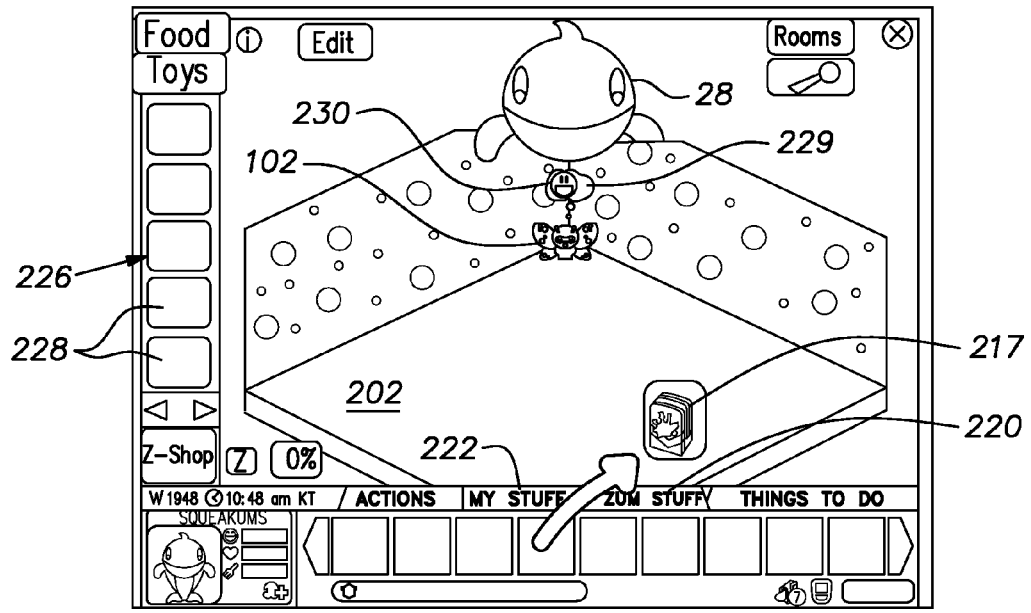
FIG. 26 shows an illustrative embodiment of one of the virtual rooms included in the map shown in FIG. 25, wherein a virtual character to which the virtual companion can be provided is shown looking into the virtual room.

The secondary virtual room 202 can optionally be accessed by the user within the previously restricted portion of the virtual world that has been accessed by the user as described above. For instance, a splash screen 210 such as that shown in FIG. 24 can be presented by the computer system to the user when the user enters Zumwhere after unlocking and gaining access to Zumwhere as described above. Selecting the "Visit Zums" icon 212 directs the user to the portion of the previously-restricted Zumwhere from where the user can select a desired secondary virtual room 202 to visit, such as by selecting the desired secondary room 202 from the room map 214 in FIG. 25. Having navigated to this previously-restricted portion of the virtual world, the secondary dock area 200 is also made accessible to the user, along with an inventory 216 of virtual items displayed therein. In this previously-restricted portion of the virtual world the inventory 216 of virtual items in the secondary dock area 200 is made available for use, but the virtual items within the inventory 111 in the primary dock area 112 is hidden from view or otherwise rendered inaccessible to the user. As can be seen in FIG. 26, the "Zum Stuff" tab 220 is active in the secondary dock area 200, while the "My Stuff" tab 222 is grayed out, rendering it unavailable to the user while visiting the secondary virtual room 202 in the previously-restricted portion of the virtual world. The My Stuff tab 222 is selectable by the user within the portions of the virtual world that were unrestricted, such as the virtual replica's virtual room 30 for example, to gain access to the inventory 111 of items displayed in the dock area 112 shown in FIG. 5. Thus, virtual items included in the inventory 216 are limited to being used within the previously-restricted portion of the virtual world such as Zumwhere. Other virtual items such as those included in the inventory 111 under the My Stuff tab 222 and displayed in the primary dock area 112 shown in FIG. 5 are limited by the computer system to being used within the unrestricted portion of the virtual world. Prizes awarded to the user for capturing photographs of Zums as described above or otherwise obtained within the previously-restricted portion of the virtual world can optionally be included in the inventory 111 displayed in the primary dock area 112 of FIG. 5, limited by the computer system 34 to being used within the unrestricted portion of the virtual world and not the previously-restricted portion of the virtual world. According to alternate embodiments, virtual prizes obtained by the user within the previously-restricted portion of the virtual world can optionally be included in the inventory 216, and limited by the computer system 34 to being used within the secondary virtual room 202 (FIG. 26) of the previously-restricted portion of the virtual world, and not the unrestricted portion of the virtual world. Yet alternate embodiments include virtual items such as virtual currency earned in unrestricted and/or previously-restricted portions of the virtual world, for example, that are usable in both the unrestricted and previously-restricted portions of the virtual world.

The view of the secondary virtual room 202 in FIG. 26 also includes a toy and food palette 226 that is to be displayed to the user while visiting the secondary virtual room 202. Virtual toys and virtual food items for the virtual companions 102 are stored in menu locations 228 in the toy and food palette 226, from where they can be dragged and dropped, or otherwise inserted into the secondary virtual room 202 for the virtual companions 102 therein. Likewise, virtual items in the inventory 216 shown in the secondary dock area 200 can also be dragged and dropped, or otherwise inserted into the secondary virtual room 202 from the inventory 216 for the virtual companions 102. For example, a piece of virtual furniture 217 can be dragged from the inventory 216 and dropped within the secondary virtual room 202 for the virtual companion 102 to sit on or otherwise interact with. The interactions between the virtual companion 216 and virtual items within the secondary virtual room 202 can include an animation of the virtual companion 102, the transmission of an audio component, or a combination thereof. In addition to virtual furnishings 217, the virtual items placed in the secondary virtual room 202 can include at least one of a virtual toy for the virtual companions 102 play with in the secondary virtual room 202, virtual food to be consumed by the virtual companions 102 within the secondary virtual room 202, and the like. Alternate embodiments optionally include a limit to the quantity of virtual items that can exist within the secondary virtual room 202 at any given time. For instance, the computer system can optionally limit the number of virtual furnishings that can appear in the secondary virtual room 202 at a time.

The virtual companions 102 in the secondary virtual room 202 can exhibit emotions indicating a general state of their happiness. In FIG. 26, a thought bubble 229 is displayed as coming from the virtual companion 102. A smiley emoticon 230 or other symbolic representation of emotion appears within the thought bubble 229, indicating that the virtual companion's happiness level is high. Similar to the virtual replica 28, each virtual companion 102 can include at least one of a health, happiness and hunger level associated therewith. The at least one of the health, happiness and hunger levels has an influence on the emotional state of the virtual companions 102 that, in turn, influences the symbolic representation displayed within the thought bubble 229. The user can interact with the virtual companions 102 within the secondary virtual room 202 to maintain the at least one of the health, happiness and hunger levels. For instance, the user can remove virtual food 232 from the toy and food palette 226 and place the virtual food 232 within the secondary virtual room 202 as shown in FIG. 27 instead of feeding it directly to a specific virtual companion. Depending on the level of each virtual companion's happiness, hunger, health, etc. . . . , the computer system determines a probability of each virtual companion 102 attempting to eat the virtual food 232. This probability is specific to each virtual companion 102, and can be affected by factors such as the time that has passed since each virtual companion 102 has last eaten, the degree to which each virtual companion 102 desires the particular virtual food 232 placed in the room, and so on.

If the probability for each virtual companion 102 is low enough, the virtual food 232 placed in the secondary virtual room 202 will expire when not eaten by a virtual companion 102 within the secondary virtual room 202 within a predetermined period of time. In such instances, the virtual food 232 can be removed from the secondary virtual room 202, but is not returned to the toy and food palette 226. Instead, the virtual food 232 is wasted, and does not affect the health, happiness or hunger level of any of the virtual companions 102.

Figure 28:
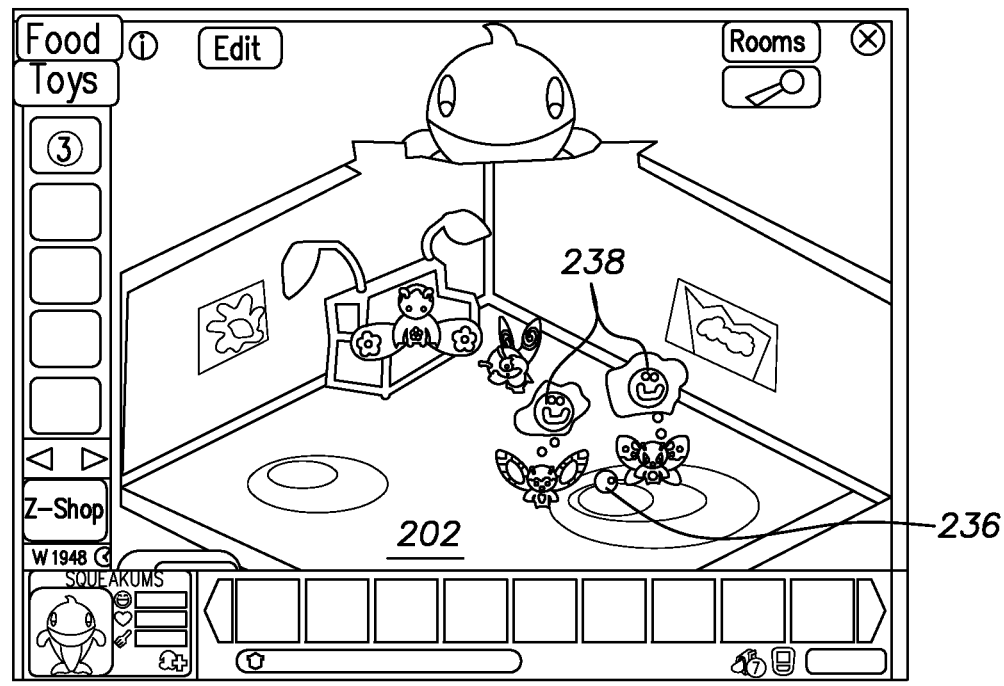
FIG. 28 shows an illustrative embodiment of virtual companions playing with a virtual toy within a virtual room associated with at least one of the virtual companions.

A virtual toy 236 such as that shown in FIG. 28 can also be removed from the toy and food palette 226 and placed in the secondary virtual room 202. Like the virtual food 232, the virtual toy 236 can optionally be limited by the computer system for use with the virtual companion 102 within the secondary virtual room 202, and can also optionally be available within the secondary virtual room 202 for a predetermined length of time. The virtual toy 236 can be played with by one or a plurality of virtual companions 102 to improve the happiness level of those virtual companions 102 involved as indicated by the emoticons 238 appearing within the thought bubbles 240. Whether one or more virtual companions 102 within the secondary virtual room 202 plays with the virtual toy 236 depends again on a probability determined by the computer system for each virtual companion 102. Factors that can affect the probability can include anything that would make a virtual companion 102 more/less likely to participate in a game including the virtual toy 236. For example, the type of each virtual companion 102 can affect the probability that those virtual companions 102 will participate in a game using the virtual toy 236 with another virtual companion 102. A first virtual companion 102 may be of a type that is generally incompatible with a second virtual companion 102 analogous to the way dogs and cats are often perceived as being naturally incompatible. For such an embodiment if the first virtual companion 102 begins to play with the virtual toy 236, the probability that the second virtual companion 102 will also participate is lower than it would be if the two virtual companions 102 were compatible. Likewise, a first virtual companion 102 may have a predetermined affinity to the particular virtual toy 236 placed in the secondary virtual room 202 compared to a second virtual companion 102. The probability that the first virtual companion 102 will play with the virtual toy 236 is greater than the probability that the second virtual companion 102 will play with the toy.

Figure 29:
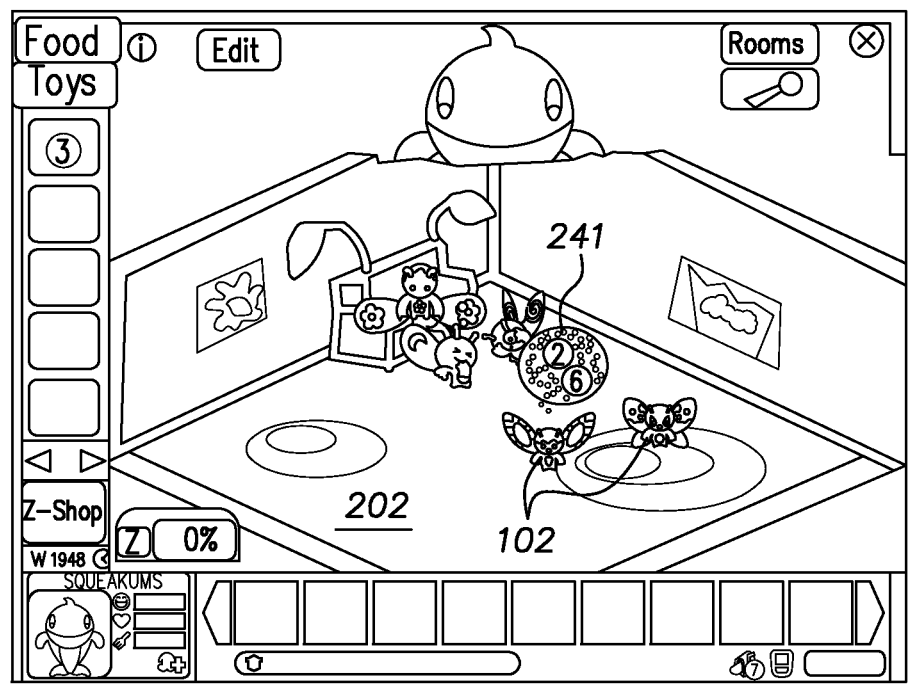
FIG. 29 shows an illustrative embodiment of a virtual companion awarding a form of virtual currency to a user.
Figure 30:
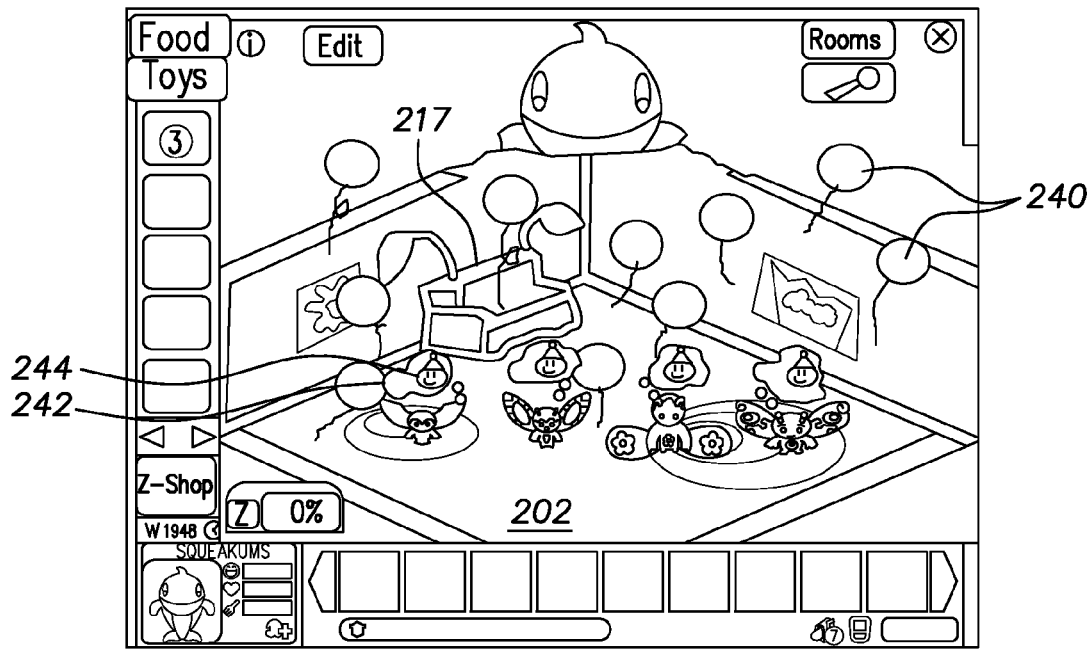
FIG. 30 shows an illustrative embodiment of virtual companions within a virtual room associated with at least one of the virtual companions, wherein each of the virtual companions in the virtual room is shown in a party mode that is entered when each of the virtual companions in the room has achieved a predetermined level of happiness

In response to elevating the at least one of the health, happiness and hunger level of a virtual companion 102 above a predetermined threshold, the computer system causes that virtual companion 102 to award the user a prize as shown in FIG. 29. For the illustrated embodiment, the virtual companion 102 is displayed with a thought bubble 241 indicating that the user has been awarded two (2) orange Zummies and six (6) turquoise Zummies for the improvement in the happiness level that resulted from playing with the virtual toy 236 shown in FIG. 28. When the at least one of the health, happiness and hunger levels of all of the virtual companions 102 in the room are at or above their respective thresholds at any given moment, such as 100% happy, for example, the computer system initiates a virtual celebration involving at least one of a video and an audio component as illustrated in FIG. 30. Virtual balloons 240 are shown descending into the secondary virtual room 202, and each virtual companion 102 is provided with a thought balloon 242 including a party emoticon 244 or other suitable emotional symbol. The virtual celebration can last a predetermined period of time such as thirty (30) seconds, for example, before being terminated. The virtual companions 102 then return to their normal routine.

In the absence of external inputs of virtual items and virtual interactions from the user, the virtual companions 102 resort to casual animations while they await another stimulus. Their casual animation of each virtual companion 102 can optionally reflect the type of virtual companion 102. For instance, a winged virtual companion 102 can optionally fly around the secondary virtual room 202 in a random pattern. According to alternate embodiments, each virtual companion 102 can have a personality that influences its casual animations. For instance, a virtual companion 102 in the form of a Giggly Zum described below can appear to giggle, and also be accompanied by a giggling sound. Whether, the type of, and how often each virtual companion 102 performs a casual animation can also be based on a probability determined by the computer system based on any suitable factor. For example, a virtual companion 102 with a relatively low happiness level is more likely to pout that a virtual companion 102 with a relatively high happiness level. The lower the happiness level of the virtual companion 102, the greater the frequency at which the virtual companion 102 will pout.

Any of the probabilities discussed herein can optionally be variable, and influenced by any number of factors. In the preceding example, as the happiness of the virtual companion 102 increases, the probability that the virtual companion 102 will pout decreases. However, to limit the maintenance activities that are to be performed in order to maintain the at least one of the health, hunger and happiness of the virtual companions 102, the rate at which one or more of these levels decreases slows as they decrease. For example, a virtual companion 102 that is 100% happy may have its happiness decrease 2% for every thirty (30) minutes of time that expires without being subjected to any stimulus that would ordinarily serve to increase the happiness of that virtual companion 102. However, when the happiness of that virtual companion 102 is only 50%, then the rate at which the happiness decreases further can optionally be reduced from 2% for every thirty (30) minutes to 1% every sixty (60) minutes. Thus, the at least one of the health, hunger, happiness and other well being parameter(s) of the virtual companion 102 can optionally decay in a non-linear manner, at different rates depending on the current value of that parameter.

Selecting and capturing photographs of individual Zums 59 as discussed above occurs in a restricted portion of the virtual world after that portion was unlocked by the user. However, alternate embodiments such as that illustrated in FIG. 14 involve displaying a Zum 122 outside of the restricted portion of the virtual world after said restricted portion has been unlocked, or before the restricted portion has been unlocked by the user. According to such embodiments, the Zum 122 can be randomly displayed outside of the restricted portion of the virtual world to occasionally challenge the user to select the Zum 122 before it disappears from view. The user can select the Zum 122 once it appears by placing the cursor on the Zum 122 and entering a selection command such as by clicking a mouse button in a known manner, for example.

Figure 14:
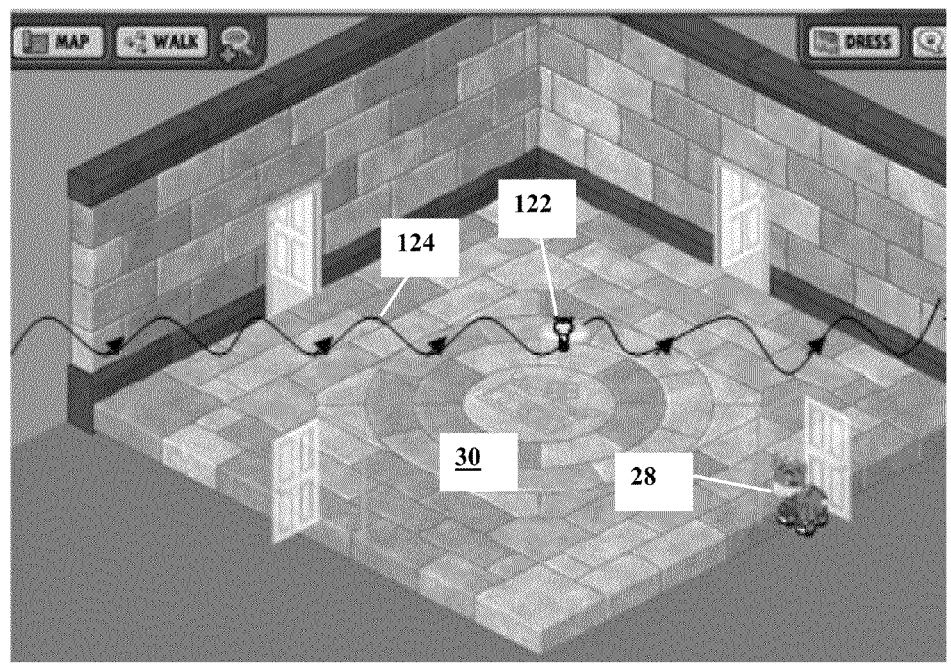
FIG. 14 shows an illustrative embodiment of a virtual room across which a Zum travels along a substantially sinusoidal path.

Once displayed, the Zum 122 remains displayed for a short period of time before it disappears from view and can no longer be selected by the user. The challenge to select the Zum 122 while in view is enhanced by the Zum 122 travelling along a pattern 124 while it is being displayed. As shown in FIG. 14 the displayed Zum 122 follows a substantially sinusoidal pattern 124 as it travels across the virtual room 30 in which the virtual replica 28 is located. If the Zum 122 in FIG. 14 travels entirely across the virtual room 30 it will disappear from view when it reaches the end of the displayed portion of the virtual world. Displaying a Zum 122 in this manner can occur at regular intervals, randomly, a predetermined number of times per period such as once a day, or at any other frequency.

Figure 15:
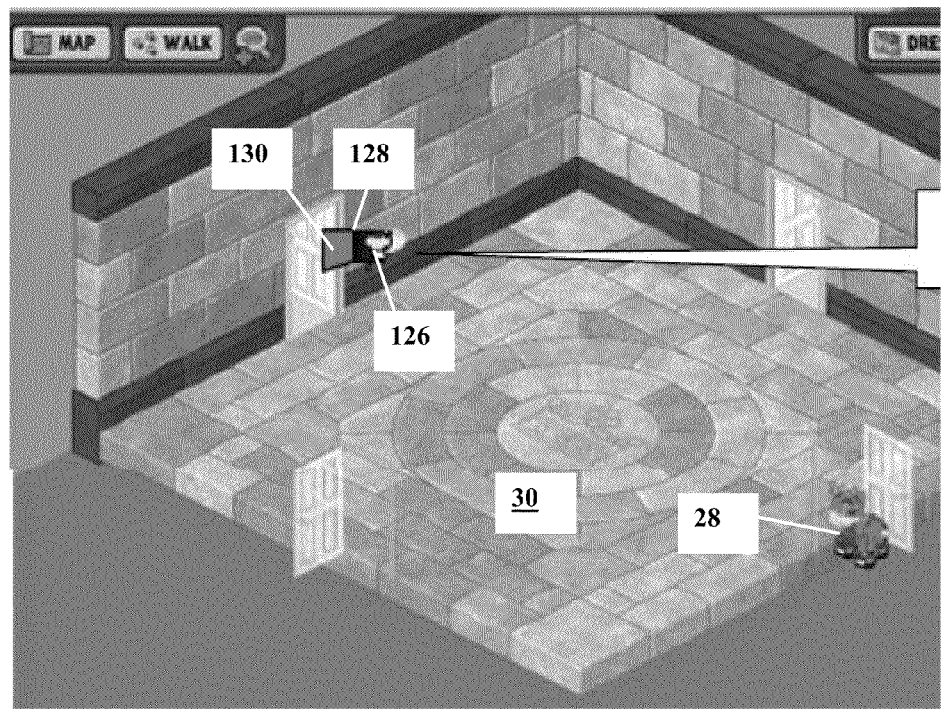
FIG. 15 shows an illustrative embodiment of a virtual room in which a Zum briefly appears through a randomly generated virtual door.

The Zum 122 appearing in FIG. 14 is but one of a plurality of different display types, or display categories of Zums 122, each optionally having a different appearance when displayed. Each different type of Zum 122 can optionally be displayed differently when appearing in the virtual world. Further, successfully selecting the Zum 122 while temporarily displayed can result in a prize being awarded to the user, similar to the prizes awarded to the user in response to successfully selecting a Zum 122 within the restricted portion of the virtual world described above. For example, in FIG. 15 a so-called "Bratty Zum" 126 is displayed in a virtual doorway 128 that has been displayed at a random location within the virtual room 30 in which the virtual replica 28 is located. Once displayed, the Bratty Zum 126 will remain displayed for a period of one to three seconds before disappearing from view. After this period expires the Bratty Zum 126 will duck back into the virtual doorway 128 and a virtual door 130 will be animated in a manner that makes the virtual doorway 128 appear to close. The closing of the door 128 can optionally be accompanied by an audio component including the sound of a closing door.

The prizes awarded to the user can be similar to the prizes discussed above as being awarded in response to selection of the Zums in the restricted portion of the virtual world. Examples of such prizes include virtual currency, a virtual companion for the virtual replica 28, another virtual object, a virtual photograph of the selected Zum, and the like, which can also be conditionally awarded, such as based on successful completion of one or more challenges, for example, as discussed above. Also, the computer system 34 may optionally award the prize only in response to the first time a particular Zum 122 is selected by the user. For example, a prize can be awarded in response to the first selection of a Bratty Zum 126, but not in response to the repeated selection of another Bratty Zum 126. According to alternate embodiments, repeated selection of the same type of Zum will result in an award each time, or upon selecting the same type of Zum a predetermined number of times. This can apply to selection of Zums in the restricted portion of the virtual world once the user has gained access to that portion and selection of Zums in unrestricted portions of the virtual world.

Figure 16:
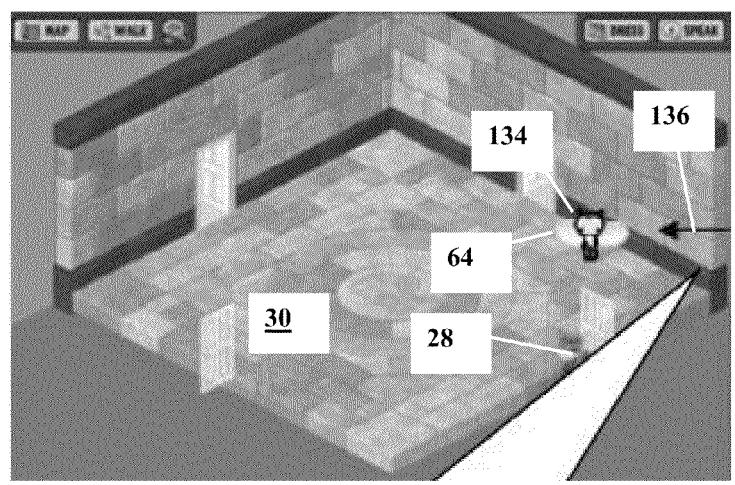
FIG. 16 shows an illustrative embodiment of a virtual room in which a Zum briefly appears from a random location along a perimeter of the virtual room.

Another example of a different type of Zum is shown in FIG. 16. A so-called "Giggly Zum" 134 is quickly introduced to the display of the virtual room 30 from the rightmost, or other portion of the perimeter of the display along arrow 136. The Giggly Zum 134 travels only a short distance into the displayed portion of the virtual world before pausing at a stationary location for a short period of about one to three seconds. Once that period expires, the Giggly Zum 134 disappears from view by travelling in a direction exactly opposite arrow 136.

Figure 17:
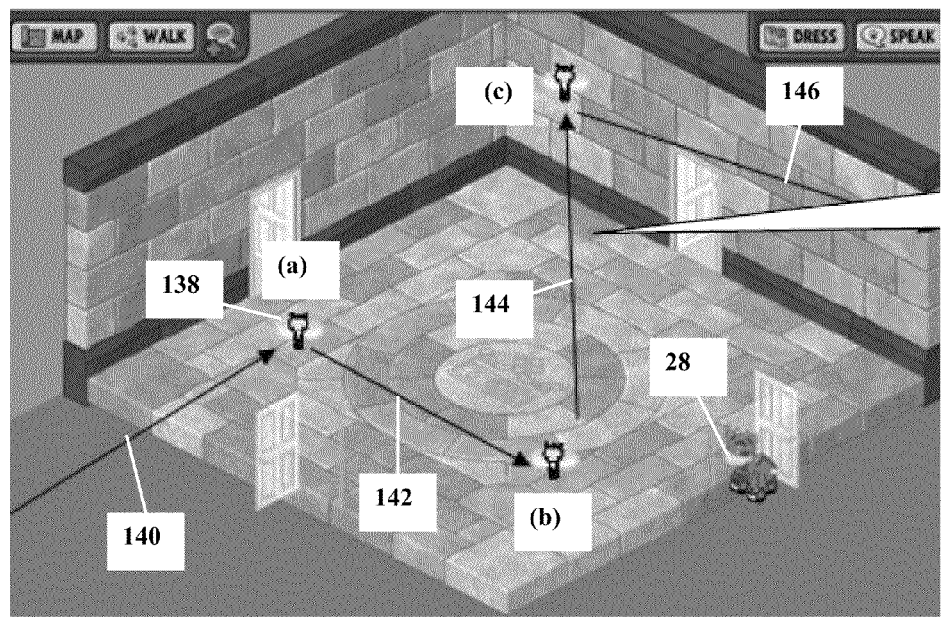
FIG. 17 shows an illustrative embodiment of a virtual room in which a Zum briefly appears and travels along a random, broken path.

Yet another example of a different type of Zum is shown in FIG. 17. A so-called "Zippy Zum" 138 rapidly enters the displayed portion of the virtual world along arrow 140 before pausing momentarily at a first location (a). The Zippy Zum 138 then travels quickly along the path defined by arrow 142 to location (b), where it then again pauses momentarily. After travelling rapidly along arrow 144 to location (c) and momentarily pausing, the Zippy Zum 138 then exits the displayed portion of the virtual world along arrow 146. Each pause of the Zippy Zum 138 at the various locations can be short, from about one second to about three seconds long, and can optionally change between locations. Further, the various locations, the path along which the Zippy Zum 138 travels to reach those locations, or a combination thereof can be randomly selected, or at least different each time the Zippy Zum 138 is displayed. The arrows indicating paths along which Zums travel do not appear in the display, but are shown in the figures for illustration purposes only.

The user can optionally be forewarned of the impending display of a Zum in the portion of the virtual world to provide the user with a greater likelihood of successfully selecting the Zum once displayed. For instance, before the Giggly Zum 134 is displayed, an audible giggling sound is played by the user computer 38 to provide the user with a brief warning of Giggly Zum's impending entrance into the displayed portion of the virtual world. Likewise, an outline of the virtual doorway 128 can be flashed within the displayed portion of the virtual world at a location where the virtual doorway 128 through which the Bratty Zum 126 will appear. Other embodiments can provide both an audible and a visible forewarning of the impending display of a Zum to the user. The warning of an impending display of a Zum can optionally include an audible sound, a visual display or both an audible sound and a visual display unique to each of a plurality of different types of Zum to be broadcast by the computer system to the user.

Figure 20:
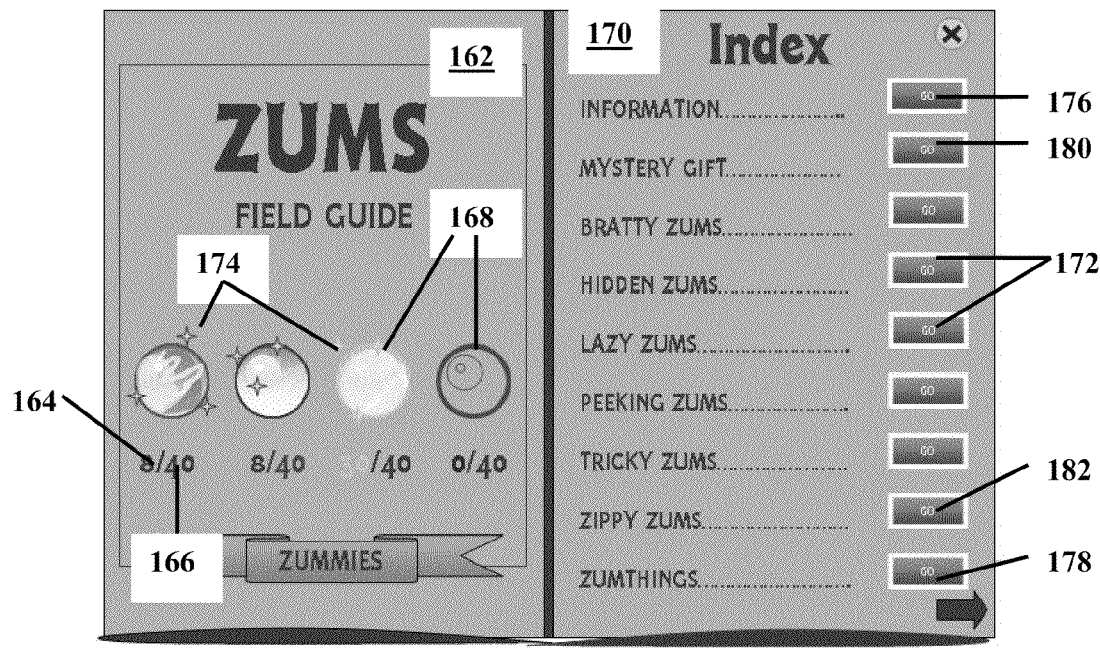
FIG. 20 shows an illustrative embodiment of a summary portion of a virtual photo album.

Regardless of whether the Zums are selected by the user within the restricted portion of the virtual world after having been unrestricted, or outside of the restricted portion of the virtual world, the Zums selected by the user can be documented within the virtual photo album 68, as shown in FIG. 20. The virtual photo album 68 can be made accessible by the user at all times within the virtual world, in response to the user gaining access to the restricted portion of the virtual world, in response to the user's selection of the first Zum, in response to validation of a registration code associated with a real-world photo album, in response to the purchase of the virtual photo album 68 by the user with virtual currency within the virtual world, or in any other suitable manner. According to embodiments where the virtual photo album 68 is to be acquired by the user using virtual currency or a registration code, acquisition of the virtual photo album 68 can optionally be required as a prerequisite to selecting Zums to be added to the virtual photo album 68.

FIG. 20 illustrates an embodiment of a summary section of the virtual photo album 68. The summary section in FIG. 20 includes a currency summary page 162 that discloses the amount of virtual currency 164 possessed by the user out of an upper limit 166 of the virtual currency that can possibly be held by the user at one time in each of a plurality of different categories 168 of virtual currency.

As discussed above, selecting a Zum can result in the user being awarded a prize of virtual currency. The virtual currency awarded to the user can fall in one of a plurality of predetermined categories 168 of virtual currency that can be used to purchase virtual items within the virtual world. If, at step 82 of FIG. 11A the user elects to view the virtual photo album 68 following selection of a Zum for example, the virtual photo album 68 can be displayed. An animation such as twinkling stars 174 (FIG. 20) can be displayed to reflect the virtual currency awarded in response to selection of the most-recently-selected Zum. For the example shown in FIG. 20, the stars 174 displayed indicate that virtual currency has been awarded to the user in the first three categories 168 shown, and no virtual currency in the fourth category as indicated by the absence of stars 174 and a zero balance for that category. According to alternate embodiments, the animation displayed indicating the virtual currency earned by the user can be accompanied by, or replaced by an audio presentation and/or a static visual display.

The virtual currency earned by selecting Zums can optionally be limited to being used within the restricted portion of the virtual world, once unlocked by the user; can be spent elsewhere within the virtual world; or a combination thereof. If the amount of virtual currency 164 owned by the user in a category 168 has reached the upper limit 166, future awards of virtual currency in that category 168 will not be added to the amount virtual currency 164 until the user spends some of the virtual currency 164 to bring the amount of virtual currency 164 owned by the user to a value that is less than the upper limit 166.

The summary section of the virtual photo album 68 also includes an index page 170 that comprises links 172 to the pages of the virtual photo album 68 associated with different categories of Zums. A link 176 to an information page and a link 178 to a page of the virtual photo album 68 summarizing virtual items awarded to the user in response to successfully selecting a Zum, or unsuccessfully attempting to select a Zum, can also optionally be provided. Further a link 180 can also be provided to a page of the virtual photo album 68 associated with a mystery gift awarded to the user in response to successfully selecting each Zum in all of the different categories of Zums.

Figure 21:
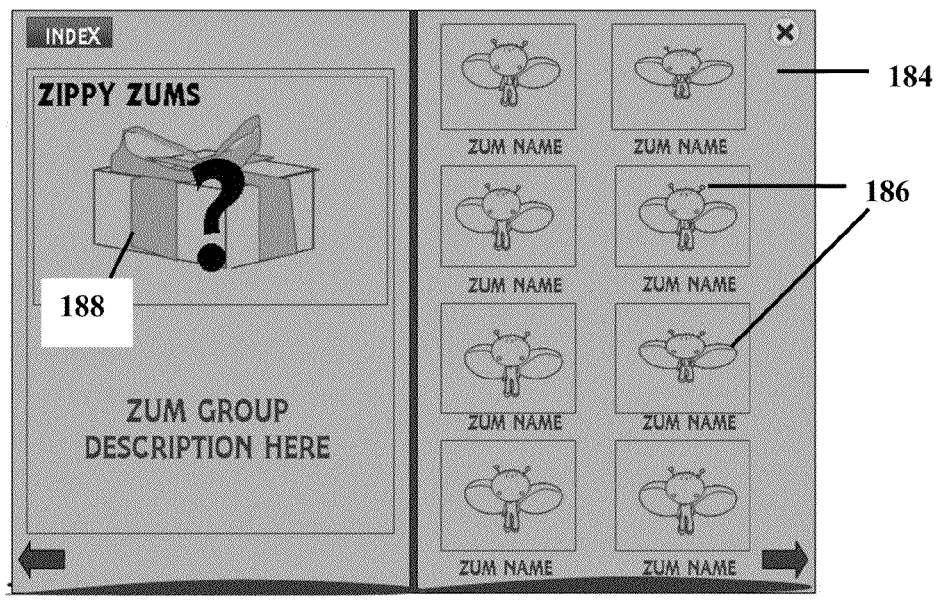
FIG. 21 shows an illustrative embodiment of a Zippy Zum portion of a virtual photo album.

Selecting a link 172 corresponding to a specific type of Zum causes a section of the virtual photo album 60 associated with that type of Zum to be displayed as shown in FIG. 21. There can be a plurality of individual Zums, each optionally having a different appearance, in each category of Zum. For example, in response to selecting a link 182 in FIG. 20 corresponding to the Zippy Zums, the page of the virtual photo album 68 corresponding to the Zippy Zums is displayed as shown in FIG. 21. A page 184 shown in FIG. 21 includes a grayed-out image of eight different Zippy Zums 186 that can be selected by the user in the virtual world to be added to the virtual photo album 68. Each different Zippy Zum 186 can be converted from the grayed-out image to a color image, or otherwise altered to distinguish between Zippy Zums 186 that have been selected and added to the virtual photo album 68 and those that have not. Upon being added to the virtual photo album 68, each Zippy Zum 186 can optionally be transformed from an inanimate graphic to include animated appearance within the virtual photo album 68 comprising an audio presentation, video presentation or both an audio in a video presentation.

Additionally, the Zippy Zum section displayed in FIG. 21 includes a page presenting a Zippy Zum prize 188 that is to be awarded to the user in response to the addition of all Zippy Zums 186 to the virtual photo album 68. A prize can be awarded to the user in response to the addition of each Zum belonging to a particular type of Zums, but awarding the user a prize in response to completion of the Zippy Zum group only will be described below for the sake of brevity. The identity of the Zippy Zum prize 188 can optionally be concealed from the user until all of the Zippy Zums 186 have been added to be virtual photo album 68. Although the Zippy Zum prize 188 is visible within the display of FIG. 21, the user is unable to select the Zippy Zum prize 188, and hence identify the Zippy Zum prize 188, until after all Zippy Zums 186 have been added to the virtual photo album 68 and the Zippy Zum prize 188 selected. Once all of the Zippy Zums 186 have been added to the virtual photo album 68 the user is presented with the opportunity to select the Zippy Zum prize 188 to have that prize associated with the user account. An audio, video, or both an audio and a video presentation can be presented to the user during the awarding of the Zippy Zum prize 188. The Zippy Zum prize 188 can then be added to the menu such as the menu 112 shown in FIG. 5 from where the user can retrieve the Zippy Zum prize 188 for use in the virtual world. Examples of the Zippy Zum prize 188 include a piece of virtual furniture that can be added to the virtual room 30 associated with the virtual replica 28, virtual currency, a virtual companion 102 for the virtual replica 28 or any other suitable reward. The Zippy Zum prize 188, like the virtual currency and other virtual items awarded to the user in response to selection of a Zum as discussed herein may optionally be traded by the user in exchange for a different virtual item from a user controlling a different virtual replica in the virtual world.

Figure 22:
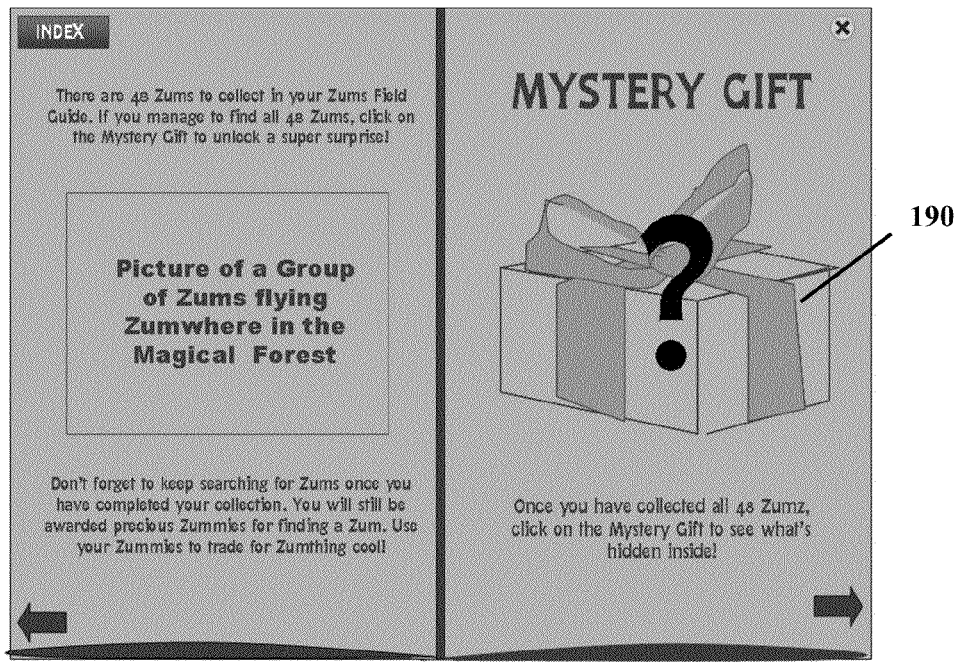
FIG. 22 shows an illustrative embodiment of mystery gift portion of a virtual photo album.

Selecting the link 182 leading to the mystery gift portion of the virtual photo album 68 directs the user to a page displaying a mystery gift 190 to be awarded to the user for adding each Zum in all of the different categories of Zums to the virtual photo album 68 as shown in FIG. 22. For the embodiment of the virtual photo album 68 shown in FIG. 20 there are six different categories of Zums, each category including eight individual Zums to be added to the virtual photo album 68. Once all 48 Zums have been added to the virtual photo album 68 by the user the mystery gift 190 appearing in FIG. 22 is transformed from a grayed out image or other non-selectable item to a full-color image that can be selected by the user to have the identity of the mystery gift 190 revealed and the mystery gift 190 associated with the user account. Like the Zippy Zum prize 188, the mystery gift 190 can be added to the menu 112 shown in FIG. 5. This transformation making the mystery gift 190 available to the user can optionally be accompanied by an audio, video, or both an audio and a video notification. According to one embodiment, the mystery gift 190 awarded to the user is not transferable by the user to another user controlling a different virtual replica within the virtual world, and is not available be used by the user as virtual currency within the virtual world to be exchanged for another virtual item. Even though all Zums have been added to the virtual photo album 68, the user can optionally continue to select Zums within the virtual world to earn additional virtual currency and other virtual prizes that can be used for barter in the virtual world.

Figure 23:
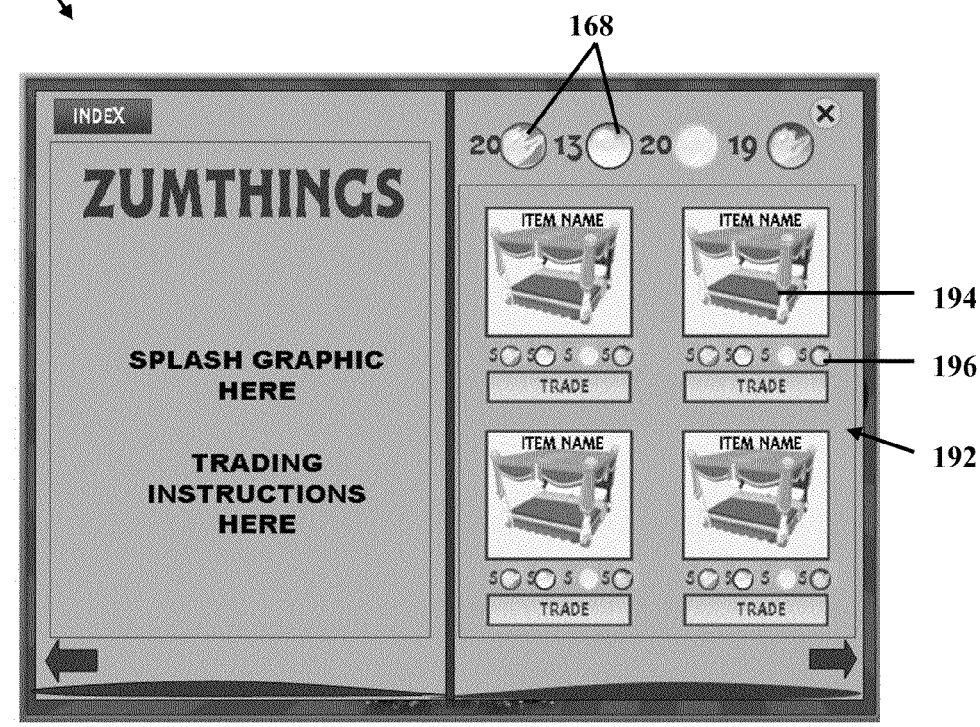
FIG. 23 shows an illustrative embodiment of a trade interface in a virtual photo album.

To facilitate a trade of at least a portion of a prize awarded to the user in response for selection of a Zum a trade interface 192 such as that shown in FIG. 23 can be presented to the user. The trade interface 192 presents the user of the virtual catalog of virtual items the user can obtain in exchange for at least a portion of the prizes that have been awarded to the user. For example, the trade interface 192 in the embodiment shown in FIG. 23 enables the user to trade some of the user's virtual currency 164 in one or more of the categories 168 in exchange for virtual furniture 194. A price 196 is displayed in the trade interface 192 to indicate the quantity of virtual currency 164 from each category 168 the user must relinquish to obtain the virtual furniture 194.

For the embodiment shown in FIG. 23, the virtual item to be obtained by the user includes virtual furniture 194. However, other embodiments allow the user to obtain other virtual items such as a virtual toy that the virtual replica 28 can play with in the virtual world, a virtual food item that can subsequently be fed to the virtual replica, a virtual companion associated with the user account, and any other virtual item permitted to be obtained via a trade. Further, the trade interface shown in FIG. 23 is to facilitate a trade between the user and a virtual store offering virtual furnishings 194 for sale. However alternate embodiments can include a trade interface 192 to facilitate trades of virtual items associated with the user account in exchange for virtual items associated with the user account of other users controlling different virtual replicas within the virtual world. Once the user has acquired a virtual item via trade, that virtual item becomes associated with the user account and optionally available to be tendered by the user in a subsequent trade. Again, items such as the mystery gift and the prize awarded to the user in response to the addition of each Zum within a category of Zums can individually be available for trade or unavailable for trade.

Figure 31:
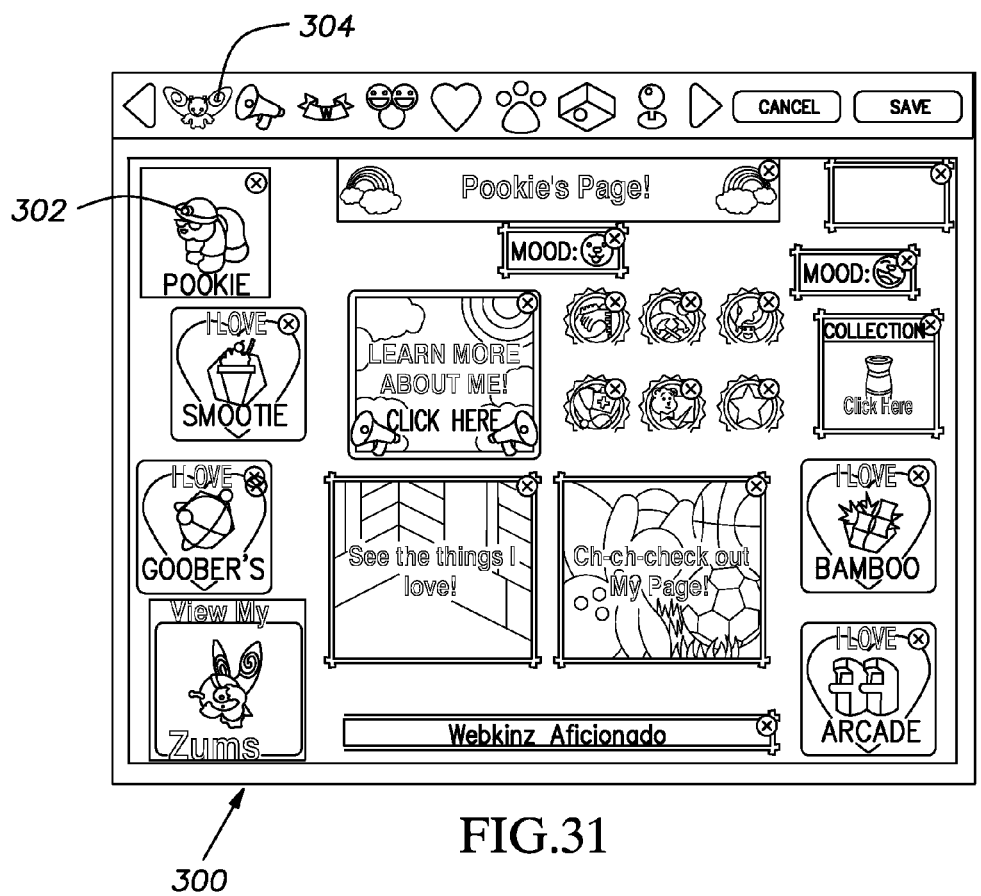
FIG. 31 shows an illustrative embodiment of a virtual webpage associated with a virtual character.

A user can also optionally customize a virtual webpage 300, such as that shown in FIG. 31, for one or more of the virtual characters 302 associated with that user's account. The virtual webpage 300 can optionally be an actual webpage displayed by the computer system 34 via a web browser, but is referred to herein as being a virtual webpage 300 in the sense that it is a webpage that exists and must be accessed from within the virtual world. The virtual webpage 300 can optionally be limited to only being accessible by users who are logged into the virtual world, and who are associated as "friends" of the user whose account is associated with the virtual character 302. Each user can transmit an invitation to another user, inviting the another user to become a registered friend within the virtual world. Upon accepting the invitation, the recipient of the invitation can be registered in the virtual world as a friend of the user who extended the invitation.

Figure 32:
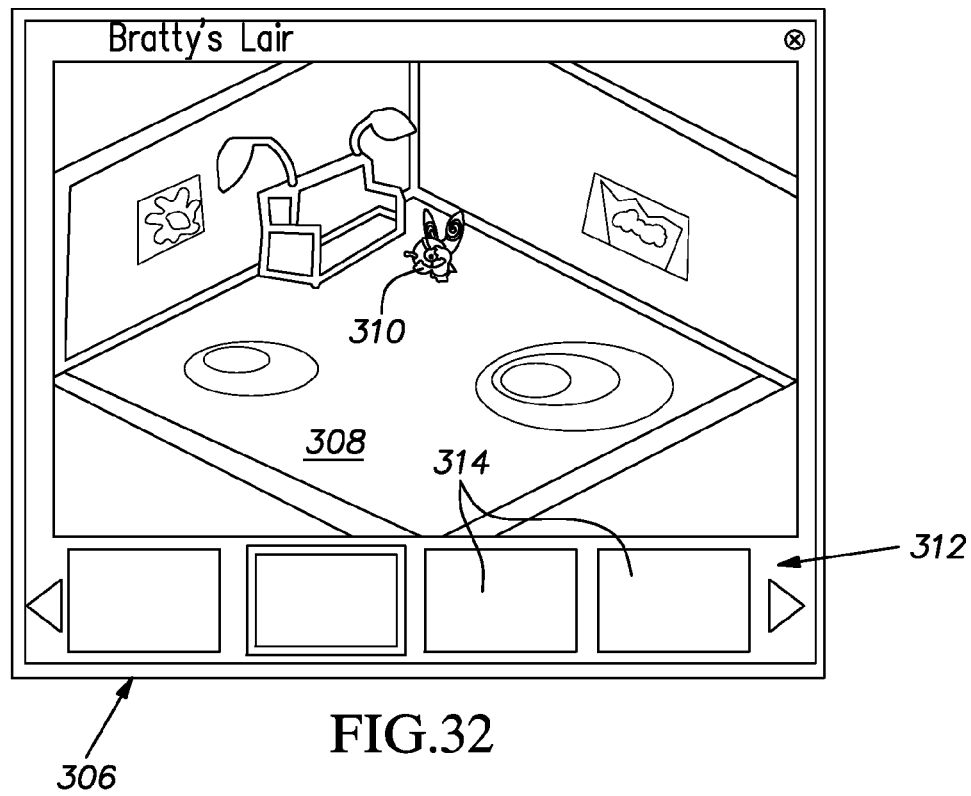
FIG. 32 shows an illustrative embodiment of a viewer presenting a friend of a user with a non-interactive view of a virtual companion within a virtual room associated with the virtual companion.

Friends of the user in the virtual world can be granted limited access to portions of the virtual world such as the virtual character 302 and other virtual items associated with the user's account that non-friend users can not access. For example, a friend of a user can retrieve and view the virtual webpage 300 associated with the user's virtual character 302. The embodiment of the virtual webpage 300 shown in FIG. 31 includes a Zum Viewer icon 304 that is made available to, and can be selected by the user's friend. In response to selecting the Zum Viewer icon 304, the friend is to be presented with the Zum Preview window 306 shown in FIG. 32. The Zum Preview window 306 provides the friend with a non-interactive view into the virtual room 308 associated with one or more of the virtual companions 310 associated with the user, as well as the one or more virtual companions 310 associated with the user's account. The friend's view into the virtual room 308 including the virtual companion 310 is said to be non-interactive because the friend is granted access to view the virtual room 308 and/or the virtual companion 310, and optionally information about the virtual room 308 and/or virtual companion 310, but not to control or otherwise actively interact with virtual items within the virtual room 308 and/or the virtual companion 310. The Zum Preview window 306 can also optionally present the friend with an inventory 312 of all virtual companions 310 associated with the user's account. The friend can quickly navigate between virtual rooms 308 and/or virtual companions 310 by selecting the appropriate inventory slot 314 in which the virtual room 308 and/or virtual companion 310 of interest is displayed.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of providing a virtual presentation, the method comprising:
    using a computer system, representing a toy with a virtual character in the virtual world, said virtual character being controllable according to commands input by a user via the computer system;
    using the computer system, providing a plurality of different virtual beings in a game activity in the virtual world, wherein the game activity involves the user selecting at least one of the virtual beings during participation by the user in the game activity and as an objective that is to be completed as part of a progression of the game activity to be saved in a user account belonging to the user for subsequent selection by the user from the user account to become a virtual companion of the virtual character;
    in response to selection of the virtual companion by the user, associating the virtual companion with the virtual character controlled by the user;
    displaying the virtual companion within a close proximity of the virtual character in the virtual world to establish a relationship between the virtual character and the virtual companion;
    moving the virtual character to a desired location within the virtual world in response to commands input by the user; and
    substantially maintaining the relationship between the virtual character and virtual companion to be substantially constant and providing the virtual companion with an animated appearance while the virtual character is moved.

2. The method according to claim 1, wherein the relationship between the virtual character and the virtual companion comprises the virtual companion hovering adjacent to the virtual character.

3. The method according to claim 1, wherein the relationship between the virtual character and the virtual companion comprises the virtual companion being coupled to the virtual character.

4. The method according to claim 1 further comprising:
providing the user with a virtual dwelling for the virtual companion within the virtual world, wherein the user can elect to store the virtual companion within the virtual dwelling when the virtual companion is not displayed within the close proximity to the virtual character.

5. The method according to claim 4, wherein the virtual dwelling is to be positioned as a virtual furnishing by the user within a virtual room associated with the virtual character to display the virtual companion when not within close proximity to the virtual character.

6. The method according to claim 4, wherein the virtual dwelling includes a plurality of separate dwelling units, each for storing a different one of a plurality of virtual companions associated with the virtual character.

7. The method according to claim 4 further comprising:
using the computer system, receiving and validating a plurality of different access codes associated with a plurality of different real-world toys possessed by the user;
in response to said receiving and validating, granting the user access to a virtual companion for the virtual character, allowing the user to establish a relationship between the virtual character and the virtual companion by positioning the virtual companion in close proximity to the virtual character; and
substantially maintaining the relationship between the virtual companion to the virtual character following movement of the virtual character controlled by the user.

8. A method of providing a virtual presentation comprising:
using a computer system, granting a user access to a virtual character within a virtual world and allowing the user to control movement of the virtual character within a first, unrestricted portion of the virtual world after creation of a user account;
using the computer system, receiving and validating an access code associated with a real-world toy possessed by the user to be associated with the user account;
in response to receiving and validating the access code, granting the user access to a second, restricted portion of the virtual world where the user can select a virtual companion for the virtual character, allowing the user to establish a relationship between the virtual character and the virtual companion by causing the virtual companion to be positioned in close proximity to the virtual character within the virtual world, wherein access to the restricted portion by the user is limited after the user has been granted access to the first, unrestricted portion of the virtual world but before the access code is received and validated; and
substantially maintaining the relationship between the virtual companion and the virtual character while following movement of the virtual character in the virtual world in response to an input from the user requesting movement of the virtual character.

9. The method according to claim 8, further comprising granting access to the virtual character in response to validation of a registration code associated with a real-world toy that is to be represented in the virtual world by the virtual character.

10. The method according to claim 8, wherein granting the user access to the virtual companion comprises:
associating the virtual companion with a user account belonging to the user; and
adding the virtual companion to a menu of virtual items associated with the user account, wherein the virtual companion is to be selected from the menu and positioned within close proximity to the virtual character by the user to establish the relationship between the virtual character and the virtual companion.

11. The method according to claim 8, wherein the virtual companion is a flying pet that hovers adjacent to the virtual character when the relationship between the virtual character and the virtual companion is established.

12. The method according to claim 11, wherein the flying pet comprises a set of animated wings.

13. The method according to claim 8, wherein the virtual companion is a virtual replica of the real-world toy associated with the access code validated to grant the user access to the virtual companion.

14. A method of providing a virtual presentation comprising:
using a computer system, granting a user access to a virtual character within a virtual world and allowing the user to control movement of the virtual character within the virtual world;
using the computer system, granting the user access to a virtual companion for the virtual character and displaying the virtual companion in close proximity to the virtual character within the virtual world;
substantially maintaining the displaying between the virtual companion and the virtual character after movement of the virtual character in the virtual world in response to an input from the user requesting movement of the virtual character; and
providing the user with a virtual dwelling for the virtual companion within the virtual world and establishing a relationship between the virtual dwelling and a user account that includes a plurality of virtual belongings owned by the user in the virtual world, wherein the virtual dwelling is accessible by the user from the user account to retrieve the virtual companion from the virtual dwelling; and
allowing the user to store the virtual companion within the virtual dwelling when the virtual companion is not displayed within close proximity to the virtual character.

15. The method according to claim 14, wherein the virtual dwelling is to be positioned as a virtual furnishing by the user within a virtual room associated with the virtual character to display the virtual companion when not within close proximity to the virtual character.

16. The method according to claim 14, wherein the virtual dwelling includes a plurality of separate dwelling units, each for storing a different one of a plurality of virtual companions associated with the virtual character.

17. The method according to claim 14, wherein the virtual dwelling is to be purchased by the user using virtual currency that is not legal tender from a virtual store within the virtual world.

18. The method according to claim 14, wherein the virtual dwelling is awarded to the user in response to registration of an access code associated with a real-world toy that is represented in the virtual world by the virtual companion, the real-world toy being purchased using legal tender.

19. The method according to claim 14, wherein the virtual dwelling is awarded to the user in response to registration of an access code associated with a real-world toy that is represented in the virtual world by the virtual dwelling, the real-world toy being purchased using legal tender.

20. A method of providing a virtual presentation comprising:
- using a computer system, granting a user access to a virtual character within a virtual world and, in response to receiving input commands from the user, controlling movement of the virtual character within the virtual world in a manner consistent with the input commands;
- restricting access to a restricted portion of the virtual world to prevent the user from fully participating in an activity in the restricted portion that results in the user taking possession of a virtual being displayed within the restricted portion of the virtual world to become a virtual companion to a virtual character;
- using the computer system, receiving and validating an access code associated with a real-world object in possession of the user, wherein the access code is received over a communication network after being entered by the user via a user computer;
- in response to receiving and validating the access code, granting the user access to the restricted portion of the virtual world and allowing the user to fully participate in the activity by attempting to select the virtual being displayed within the restricted portion of the virtual world;
- subsequent to successful selection of the virtual being in the restricted portion of the virtual world, displaying the virtual being in another portion of the virtual world, other than the restricted portion of the virtual world, where said another portion was accessible to the user before granting access to the restricted portion of the virtual world, wherein the virtual being can be selected by the user in the another portion of the virtual world; and
- awarding a prize to the user in response to successful selection of the virtual being within the restricted portion of the virtual world.

21. The method according to claim 20, wherein the virtual being is one of a plurality of different types of virtual beings available to be displayed for selection by the user.

22. The method according to claim 21, wherein a first type of virtual being comprises a different appearance within the virtual world than a second type of virtual being.

23. The method according to claim 21, wherein a first type of virtual being comprises an animation within the virtual world that is different than an animation of a second type of virtual being within the virtual world.

24. The method according to claim 23, wherein the animation of the first virtual being comprises a first, random flight path in the virtual world and the animation of the second virtual being comprises a second, random flight path in the virtual world that is different than the first, random flight path.

25. The method according to claim 20 further comprising presenting the user with a warning prior to displaying the virtual being in the another portion of the virtual world.

26. The method according to claim 25, wherein the warning comprises an audible sound unique to each of a plurality of different types of virtual beings to be broadcast by the computer system to the user.

27. The method according to claim 20, wherein the prize comprises virtual currency that can be exchanged by the user within the restricted portion of the virtual world for a virtual object.

28. The method according to claim 20, wherein the prize comprises a virtual companion to be associated with the virtual character controlled by the user and displayed in close proximity to the virtual character in the virtual environment.

29. The method according to claim 20, wherein the prize comprises a virtual object to be associated with the virtual character user.

30. The method according to claim 20, wherein displaying the virtual being in the another portion of the virtual world comprises limiting a time period during which the virtual being is to be displayed and discontinuing the display of the virtual being in the virtual world when the time period has elapsed.

31. The method according to claim 30, wherein the time period is randomly established each time the virtual being is displayed.

32. The method according to claim 30, wherein displaying the virtual being in the another portion of the virtual world occurs before granting the user access to the restricted portion of the virtual world.

33. A method of providing a virtual presentation comprising:
- using a computer system, granting a user access to a virtual character in a virtual room associated with the virtual character, wherein the virtual room is customizable by the user with a virtual belonging of the user's from a user account registered to the user;
- in response to receiving commands input into the computer system by the user, controlling movement of the virtual character within the virtual room in a manner consistent with the commands;
- using the computer system, granting the user access to a virtual companion for the virtual character, wherein the virtual companion is to be selectively positioned by the user adjacent to the virtual character in the virtual room to accompany the virtual character during movements of the virtual character controlled by the user; and
- providing a secondary virtual room for the virtual companion, wherein the secondary virtual room is positionable by the user at a desired location within the virtual room and the virtual companion is selectable by the user to be repeatedly positioned adjacent to the virtual character and separated from the virtual character, and wherein the virtual companion is to be displayed within the secondary virtual room when separated from the virtual character within the virtual room.

34. The method according to claim 33, wherein access to the virtual companion is granted in response to registration of a real-world toy that is to be represented within the virtual presentation by the virtual companion.

35. The method according to claim 33, wherein the virtual companion is to be displayed accompanying the virtual character in the virtual room and displayed apart from the virtual character within the secondary virtual room.

36. The method according to claim 33 further comprising:
- in response to a command input into the computer system by the user, placing a virtual item associated with a user account in the secondary virtual room;
- establishing a time limit for displaying the virtual item within the secondary virtual room; and
- determining a probability that the virtual companion will interact with the virtual item during the time limit.

37. The method according to claim 33 further comprising maintaining at least one of a health, a happiness and a hunger of the virtual companion within the secondary virtual room in response to a stimulus command input by the user.

38. The method according to claim 37, wherein the at least one of the health, happiness and hunger of the virtual companion is independent of a health, a happiness and a hunger of the virtual character.

39. The method according to claim 33, wherein the virtual companion includes an animated appearance in an absence of a stimulus command input by the user.

40. The method according to claim 38, wherein the animated appearance is dependent at least in part on a type of the virtual companion.

41. The method according to claim 39, wherein the animated appearance is selected from a plurality of different animated appearances of the virtual companion, and each animated appearance is associated with a probability of being selected.

42. The method according to claim 41, wherein the probability of each animated appearance is dependent at least in part on a happiness of the virtual companion.

43. The method according to claim 33, wherein the secondary virtual room is included in a restricted portion of the virtual presentation, and access to the secondary virtual room is granted to the user in response to an event resulting in access to the virtual companion being granted to the user.

* * * * *

UNITED STATES PATENT AND TRADEMARK OFFICE
CERTIFICATE OF CORRECTION

| | | |
|---|---|---|
| PATENT NO. | : 8,795,072 B2 | Page 1 of 1 |
| APPLICATION NO. | : 12/578526 | |
| DATED | : August 5, 2014 | |
| INVENTOR(S) | : Karl Joseph Borst et al. | |

It is certified that error appears in the above-identified patent and that said Letters Patent is hereby corrected as shown below:

In the Specification

Column 8, starting at line 30, "converting the currencies from the first currency format to the second currency format and storing them and refreshing ads." should read --storing on the separate website user login information for the user on the multiple different websites. The user can view conversions for all of the multiple currency formats from the computer shown as 530. However, the user can only convert to those of the multiple currency formats for which the separate website has the user login information from the computer as shown in 540.--

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,795,072 B2 | Page 1 of 1 |
| APPLICATION NO. | : 12/578526 | |
| DATED | : August 5, 2014 | |
| INVENTOR(S) | : Karl Joseph Borst | |

It is certified that error appears in the above-identified patent and that said Letters Patent is hereby corrected as shown below:

This certificate supersedes the Certificate of Correction issued October 21, 2014. The certificate is vacated since the alleged error on the Certificate of Correction does not match text at corresponding location in printed patent. The Certificate of Correction was published in error and should not have been issued. The appropriate corrections to the patent are as follows:

On the Title page, item (74), Attorney, Agent or Firm, "Peane" should read --Pearne--

In the Claims

Column 27, line 4, claim 40, "The method according to claim 38" should read --The method according to claim 39--

Signed and Sealed this
Sixteenth Day of December, 2014

Michelle K. Lee
*Deputy Director of the United States Patent and Trademark Office*